US012774952B2

(12) United States Patent
Na et al.

(10) Patent No.: US 12,774,952 B2
(45) Date of Patent: Oct. 27, 2026

(54) WIDEBAND SENSING APPARATUS AND METHOD THEREOF

(71) Applicant: Artilux, Inc., Menlo Park, CA (US)

(72) Inventors: Yun-Chung Na, San Jose, CA (US); Der-Song Lin, Hsinchu County (TW); Hung-Chih Chang, Hsinchu County (TW); Shu-Lu Chen, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 110 days.

(21) Appl. No.: 18/973,299

(22) Filed: Dec. 9, 2024

(65) Prior Publication Data

US 2025/0180474 A1 Jun. 5, 2025

Related U.S. Application Data

(63) Continuation of application No. 17/331,811, filed on May 27, 2021, now Pat. No. 12,203,846.

(60) Provisional application No. 63/173,488, filed on Apr. 11, 2021, provisional application No. 63/079,452, filed on Sep. 16, 2020, provisional application No. 63/035,859, filed on Jun. 8, 2020.

(51) Int. Cl.
*G01N 21/359* (2014.01)

(52) U.S. Cl.
CPC ..... *G01N 21/359* (2013.01); *G01N 2201/126* (2013.01)

(58) Field of Classification Search
CPC ....................... G01N 21/359; G01N 2201/126
See application file for complete search history.

(56) References Cited

U.S. PATENT DOCUMENTS

| | | | |
|---|---|---|---|
| 7,643,950 B1 | 1/2010 | Getzin et al. |
| 8,033,706 B1 | 10/2011 | Kelly et al. |
| 8,098,900 B2 | 1/2012 | Determan et al. |
| 8,330,840 B2 | 12/2012 | Lenchenkov |
| 8,619,267 B2 | 12/2013 | Wong et al. |

(Continued)

FOREIGN PATENT DOCUMENTS

EP 3839551 A1 6/2021

OTHER PUBLICATIONS

Chen et al, "An Up-to-1400nm 500MHz Demodulated Time-of-Flight Image Sensor on a Ge-on-Si Platform", International Solid-State Circuits Conference, Feb. 16-20, San Francisco, 2020, 3 pages.

*Primary Examiner* — Blake C Riddick
(74) *Attorney, Agent, or Firm* — Dority & Manning, P.A.

(57) ABSTRACT

Systems and methods for sensing objects are provided. A sensing apparatus can include a sensor comprising a photo-detecting unit configured to absorb (i) a first incident light having a first wavelength to generate a first detecting signal and (ii) a second incident light having a second wavelength to generate a second detecting signal. The sensing apparatus can further include a calculation circuit coupled to the sensor. The calculation circuit can be configured to output a calculating result according to the first detecting signal and the second detecting signal. The sensing apparatus can further include an adjustment circuit coupled to the calculation circuit. The adjustment circuit can be configured to perform an adjustment to one or more functionalities associated with the sensing apparatus according to the calculating result.

20 Claims, 27 Drawing Sheets

(56) References Cited

U.S. PATENT DOCUMENTS 8,945,017 B2 * 2/2015 Venkatraman ......... A61B 5/721
600/503
9,543,282 B2 1/2017 Wong
9,590,680 B1 3/2017 Reuss et al.
10,345,447 B1 7/2019 Hicks
2002/0124631 A1 * 9/2002 Sunshine ........... G01N 33/0009
73/860
2005/0168743 A1 * 8/2005 Daugherty ............. G01N 21/86
250/559.01
2005/0174664 A1 8/2005 Ito et al.
2007/0106160 A1 5/2007 Kilgore et al.
2010/0332173 A1 12/2010 Watson et al.
2011/0004106 A1 1/2011 Iwamiya et al.
2012/0197093 A1 8/2012 LeBoeuf et al.
2013/0119255 A1 * 5/2013 Dickinson .............. G04G 21/02
250/206
2013/0144136 A1 6/2013 Rymut
2013/0258086 A1 10/2013 Erhart et al.
2014/0016803 A1 1/2014 Puskarich
2014/0231625 A1 * 8/2014 Chang ................... G01J 1/4204
250/206
2015/0247794 A1 * 9/2015 Olesberg .................. C12Q 3/00
250/339.07
2016/0026212 A1 1/2016 Lee et al.
2016/0377762 A1 12/2016 Uedaira
2017/0007130 A1 1/2017 Spaziani et al.
2017/0053964 A1 * 2/2017 Hseih .................... H10F 39/024
2017/0055860 A1 3/2017 Vermeulen et al.
2017/0311856 A1 11/2017 Lasarov
2018/0091790 A1 * 3/2018 Park ...................... G01J 3/0208
2018/0095028 A1 * 4/2018 Jourdainne ........ G01N 21/3518
2018/0164160 A1 * 6/2018 Nishiwaki ............ A61B 5/1455
2018/0167563 A1 * 6/2018 Narumi ..................... G01J 9/00
2018/0172506 A1 * 6/2018 Park ...................... G01J 1/0228
2019/0250257 A1 * 8/2019 Finkelstein .......... H04N 25/773
2019/0350498 A1 11/2019 Smith et al.
2020/0057151 A1 2/2020 Finkelstein et al.
2020/0116862 A1 * 4/2020 Xu .......................... G01S 17/08
2020/0163602 A1 * 5/2020 Pareddy ............... A61B 5/6807
2020/0249158 A1 * 8/2020 Deliwala ................ G01N 21/53
2020/0363328 A1 * 11/2020 Le ........................ G01N 21/274
2021/0055392 A1 * 2/2021 Lee ....................... G01S 7/4814
2021/0165096 A1 * 6/2021 Kato ....................... G01S 17/18
2021/0181341 A1 * 6/2021 Kato .................. G05B 13/0265
2021/0396657 A1 * 12/2021 Nagase .................. G01N 21/31
2022/0178820 A1 * 6/2022 Coutard ............. G01N 15/1434
2022/0371016 A1 * 11/2022 Aikawa ............. B01L 3/502715
2023/0057800 A1 * 2/2023 Tsai .......................... G01J 3/42

* cited by examiner

WIDEBAND SENSING APPARATUS AND METHOD THEREOF

PRIORITY CLAIM

The present application is a continuation of U.S. Non-Provisional patent application Ser. No. 17/331,811 having a filing date of May 27, 2021, now issued as U.S. Pat. No. 12,203,846 on Jan. 21, 2025, which claims filing benefit of U.S. Provisional Patent Application Ser. No. 63/035,859 having a filing date of Jun. 8, 2020, U.S. Provisional Patent Application Ser. No. 63/079,452 having a filing date of Sep. 16, 2020, and U.S. Provisional Patent Application Ser. No. 63/173,488 having a filing date of Apr. 11, 2021, all of which are incorporated herein by reference in their entirety.

FIELD

The present disclosure relates generally to sensor apparatuses. In particular, the present disclosure relates to sensing apparatuses which can absorb a plurality of light wavelengths and adjust one or more functionalities associated with the sensing apparatus.

BACKGROUND

A sensor is a device, module, machine, or subsystem that can be used to detect events or changes in its environment and send the information to other electronics. For measuring the distance, Time-of-Flight (ToF) sensor is one of the solutions to obtain the distance between the sensor and the 3D target for each point of the image, by measuring the round-trip time of a light signal provided by a laser or LED. With the development of the technologies, ToF sensor can be used in many mobile/wearable/portable telecommunication or entertainment electronics, as image sensor, data communication, or medical device and for many other suitable applications.

SUMMARY

Aspects and advantages of embodiments of the present disclosure will be set forth in part in the following description, or may be learned from the description, or may be learned through practice of the embodiments.

One example aspect of the present disclosure is directed to a sensing apparatus. The sensing apparatus can include a sensor comprising a photo-detecting unit configured to absorb (i) a first incident light having a first wavelength to generate a first detecting signal and (ii) a second incident light having a second wavelength to generate a second detecting signal. The sensing apparatus can further include a calculation circuit coupled to the sensor. The calculation circuit can be configured to output a calculating result according to the first detecting signal and the second detecting signal. The sensing apparatus can further include an adjustment circuit coupled to the calculation circuit. The adjustment circuit can be configured to perform an adjustment to one or more functionalities associated with the sensing apparatus according to the calculating result.

In some implementations, the sensor can further include a first light source configured to emit first transmitting light having the first wavelength; and a second light source configured to emit second transmitting light having the second wavelength. The first incident light can be a portion of the first transmitting light reflected by an object and the second incident light can be a portion of the second transmitting light reflected by the object.

In some implementations, the first transmitting light can be modulated at a first modulation frequency during a first time period and a second modulation frequency during a second time period.

In some implementations, the first detecting signal can have a first magnitude and the second detecting signal can have a second magnitude. The first magnitude and the second magnitude can be different.

In some implementations, the calculation circuit can include a pre-calculation unit configured to perform an integral or a differential calculation to output a pre-calculation result according to the first detecting signal and the second detecting signal. The calculation circuit can further include an AI modeling unit, coupled to the pre-calculation unit, configured to perform with an image data analysis and output a modeling signal. The calculation circuit can further include a prediction unit, coupled to the AI modeling unit, configured to predict a status as the calculating result according to the modeling signal.

In some implementations, the photo-detecting unit can include a first photodetector and a second photodetector. The first photodetector can have a first light absorption material and the second photodetector can have a second light absorption material. The first light absorption material and the second light absorption material can be different.

In some implementations, the first light absorption material can include silicon, and the second light absorption material can include germanium or III-V group material.

In some implementations, the sensing apparatus can further include a 2D photo-detecting unit configured to detect an object and generate an 2D image.

In some implementations, the calculation circuit can be configured to output the calculating result according to the first detecting signal, the second detecting signal, and the 2D image.

In some implementations, the sensor can be configured to output a depth information, a calibration information, an error correction code information or a magnitude information according to the first detecting signal and the second detecting signal.

In some implementations, the sensor can further include a light-emitting unit configured to emit a first transmitting light having the first wavelength and a second transmitting light having the second wavelength. The sensor can further include a controller configured to output a sensor output signal according to the first detecting signal and the second detecting signal. The sensor can be implemented on one or more chips.

In some implementations, the light-emitting unit can be implemented on at least a first chip, the photo-detecting unit can be implemented on at least a second chip, and the controller can be implemented on a third chip.

In some implementations, at least one of the first chip or the second chip can be wire-bonded to the third chip.

In some implementations, at least one of the first chip or the second chip can be stacked on the third chip.

In some implementations, at least one of the first chip or the second chip can be flip-chip bonded to the third chip.

In some implementations, at least one of the first chip or the second chip can be wafer-bonded to the third chip.

In some implementations, the light-emitting unit, the photo-detecting unit, and the controller can be implemented on a common chip.

In some implementations, the controller and one of the light-emitting unit or the photo-detecting unit can be implemented on a first chip. The other of the light-emitting unit or the photo-detecting unit can be implemented on a second chip.

In some implementations, the light-emitting unit can include a first chip comprising a first light source configured to emit the first transmitting light. The light-emitting unit can further include a second chip comprising a second light source configured to emit the second transmitting light.

In some implementations, the photo-detecting unit can include a first chip comprising a first photodetector configured to absorb the first incident light. The photo-detecting unit can further include a second chip comprising a second photodetector configured to absorb the second incident light.

Another example aspect of the present disclosure is directed to a sensing method. The sensing method can include absorbing, by a sensor comprising a 3D photo-detecting unit, first incident light having a first wavelength to generate a first detecting signal and second incident light having a second wavelength to generate a second detecting signal. The sensing method can further include determining, by a calculation circuit, a calculating result according to the first detecting signal and the second detecting signal. The sensing method can further include determining, by an adjustment circuit, an output to perform an adjustment to one or more functionalities associated with a sensing apparatus according to the calculating result.

In some implementations, the sensing method can further include emitting, by a first light source, a first transmitting light having the first wavelength. The sensing method can further include emitting, by a second light source, a second transmitting light having the second wavelength. The first incident light can be a portion of the first transmitting light reflected by an object; and the second incident light can be a portion of the second transmitting light reflected by the object.

In some implementations, the first transmitting light can be modulated at a first modulation frequency during a first time period and a second modulation frequency during a second time period.

In some implementations, the first detecting signal can have a first magnitude and the second detecting signal can have a second magnitude. The first magnitude and the second magnitude can be different.

In some implementations, the calculating result can be determined according to a process. The process can include performing, by a pre-calculation unit, an integral or a differential calculation to output a pre-calculation result according to the first detecting signal and the second detecting signal. The process can further include performing, by an AI-modeling unit, with an image data analysis to output a modeling signal. The process can further include predicting, by a prediction unit, a status as the calculating result according to the modeling signal.

In some implementations, the photo-detecting unit can include a first photodetector and a second photodetector. The first photodetector can have a first light absorption material and the second photodetector can have a second light absorption material. The first light absorption material and the second light absorption material can be different.

In some implementations, the first light absorption material can include silicon, and the second light absorption material can include germanium or III-V group material.

Another example aspect of the present disclosure is directed to a sensing computing device. The sensing computing device can include a sensor comprising a photo-detecting unit configured to absorb (i) a first incident light having a first wavelength to generate a first detecting signal and (ii) a second incident light having a second wavelength to generate a second detecting signal. The sensing computing device can further include one or more processors and a memory comprising one or more tangible non-transitory computer-readable media. The media can store computer-readable instructions that when executed by the one or more processors cause the one or more processors to perform operations. The operations can include determining a calculating result based at least in part on the first detecting signal and the second detecting signal. The operations can further include determining an adjustment for one or more functionalities associated with the sensing computing device based at least in part on the calculating result. The operations can further include implementing the adjustment on the sensing computing device. The sensor can include a near-infrared or short-wave infrared sensor.

In some implementations, one or more of the first wavelength or the second wavelength can include a wavelength greater than 1050 nm.

In some implementations, determining the calculating result based at least in part on the first detecting signal and the second detecting signal can include determining a material of an object associated with the first detecting signal and the second detecting signal.

In some implementations, determining the material of the object associated with the first detecting signal and the second detecting signal can include inputting the first detecting signal and the second detecting signal into a machine-learned model and receiving, as an output of the machine-learned model, an output indicative of the material of the object.

Another example aspect of the present disclosure is directed to a sensor. The sensor can include a light-emitting unit configured to emit a first transmitting light having a first wavelength and a second transmitting light having a second wavelength. The sensor can further include a photo-detecting unit configured to absorb (i) a first incident light having the first wavelength to generate a first detecting signal and (ii) a second incident light having the second wavelength to generate a second detecting signal. The sensor can further include a controller configured to output a sensor output signal according to the first detecting signal and the second detecting signal. The sensor can be implemented on one or more chips.

In some implementations, the light-emitting unit can be implemented on at least a first chip, the photo-detecting unit can be implemented on at least a second chip, and the controller can be implemented on a third chip.

In some implementations, at least one of the first chip or the second chip can be wire-bonded to the third chip.

In some implementations, at least one of the first chip or the second chip can be stacked on the third chip.

In some implementations, at least one of the first chip or the second chip can be flip-chip bonded to the third chip.

In some implementations, at least one of the first chip or the second chip can be wafer-bonded to the third chip.

In some implementations, the light-emitting unit, the photo-detecting unit, and the controller can be implemented on a common chip.

In some implementations, the controller and one of the light-emitting unit or the photo-detecting unit can be implemented on a first chip. The other of the light-emitting unit or the photo-detecting unit can be implemented on a second chip.

In some implementations, the light-emitting unit can include a first chip comprising a first light source configured to emit the first transmitting light. The light-emitting unit can further include a second chip comprising a second light source configured to emit the second transmitting light.

In some implementations, the photo-detecting unit can include a first chip comprising a first photodetector configured to absorb the first incident light. The photo-detecting unit can further include a second chip comprising a second photodetector configured to absorb the second incident light.

Another example aspect of the present disclosure is directed to an optical apparatus for optical spectroscopy. The optical apparatus can include a substrate formed using at least silicon. The optical apparatus can further include a plurality of sensors formed using at least germanium, where the plurality of sensors are supported by the substrate. The optical apparatus can further include a plurality of wavelength filters arranged between the plurality of sensors and a target object, where the plurality of wavelength filters are configured to receive reflected light from the target object and to filter the reflected light into a plurality of light beams having different wavelength ranges, and where each of the plurality of sensors is configured to receive a respective light beam of the plurality of light beams having a specific wavelength range.

In some implementations, the optical apparatus can further include circuitry coupled to the plurality of sensors. The circuitry can be to read out electrical signals generated from the plurality of sensors.

In some implementations, the optical apparatus can further include one or more processors configured to determine a property of the target object based on the electrical signals.

In some implementations, the property of the target object can include a moisture content of the target object, an amount of carbohydrates in the target object, an amount of sugars in the target object, a protein content of the target object, or a fat content of the target object.

In some implementations, the one or more processors can be configured to determine whether the target object is a counterfeit based on the property of the target object.

In some implementations, the plurality of sensors can be formed on a first die and the circuitry can be formed on a second die. The plurality of sensors can be coupled to the circuitry by die-level bonding between the first die and the second die.

In some implementations, the plurality of sensors can be formed on a first wafer and the circuitry can be formed on a second wafer. The plurality of sensors can be coupled to the circuitry by wafer-level bonding between the first wafer and the second wafer.

In some implementations, the plurality of sensors and the circuitry can be formed on the substrate.

In some implementations, the plurality of sensors can be arranged as an 1D array.

In some implementations, the plurality of sensors can be arranged as a 2D array.

In some implementations, the plurality of wavelength filters can include one or more absorption-based materials, multi-layer coatings, periodic gratings, aperiodic gratings, or a combination thereof.

In some implementations, the reflected light can range from 700 nm to 1700 nm.

In some implementations, the plurality of sensors can be arranged between the plurality of wavelength filters and the substrate.

In some implementations, the substrate can be arranged between the plurality of wavelength filters and the plurality of sensors.

In some implementations, the optical apparatus can further include a microlens array arranged between the plurality of wavelength filters and the target object.

In some implementations, the optical apparatus can further include a spacer formed between the microlens array and the plurality of sensors. The plurality of wavelength filters can be formed in the spacer.

Another example aspect of the present disclosure is directed to a method of operating an optical apparatus for optical spectroscopy. The method can include receiving, by a plurality of wavelength filters, light reflected from a target object. The method can further include filtering, by the plurality of wavelength filters, the received light into a plurality of light beams having different wavelength ranges. The method can further include receiving, by one or more respective sensors of a plurality of sensors, each of the plurality of light beams having a specific wavelength range. The method can further include generating, by the plurality of sensors, electrical signals based on the plurality of light beams. The method can further include providing, by readout circuitry, the electrical signals to one or more processors. The method can further include determining, by the one or more processors, a property of the target object based on the electrical signals.

Other example aspects of the present disclosure are directed to systems, methods, apparatuses, sensors, computing devices, tangible, non-transitory computer-readable media, and memory devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

The foregoing aspects and many of the attendant advantages of this application will become more readily appreciated as the same becomes better understood by reference to the following detailed description, when taken in conjunction with the accompanying drawings, wherein.

DETAILED DESCRIPTION

Figure 1:
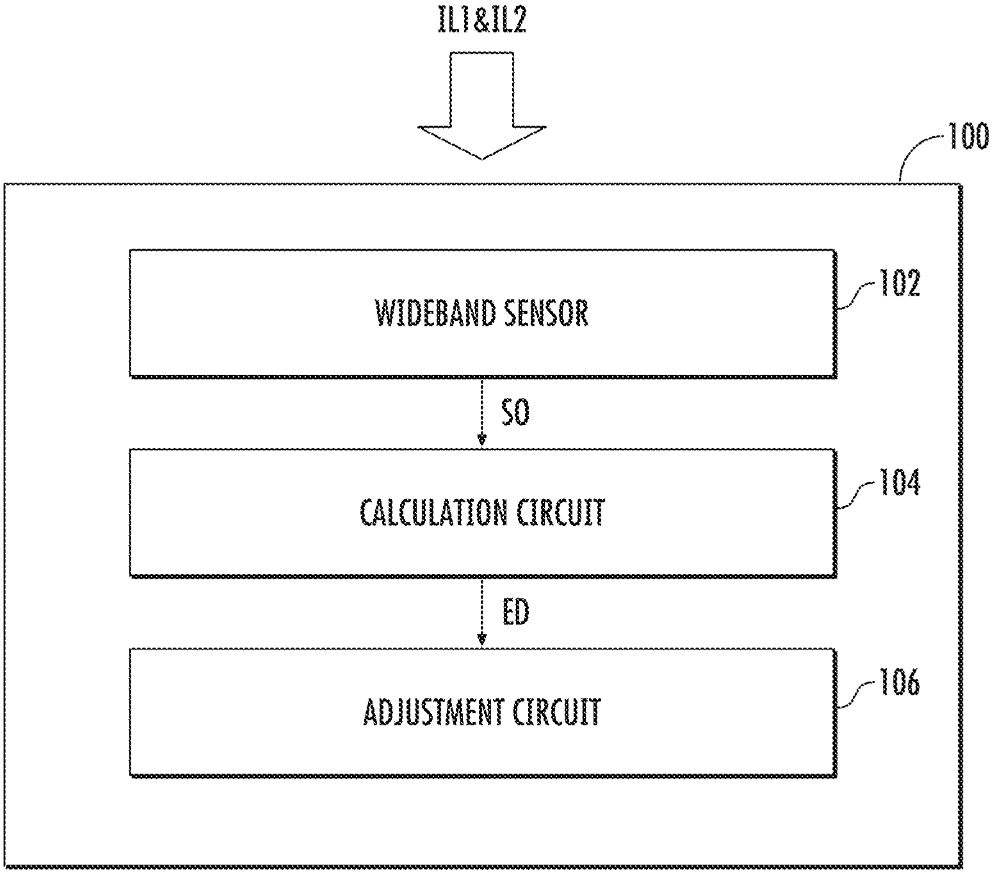
FIG. 1 depicts a block diagram of an example structure for a sensing apparatus according to example aspects of the present disclosure.

Example aspects of the present disclosure are directed to devices, systems, and methods for sensing objects and/or operating environments using wideband light wavelengths and, in response, adjusting one or more functionalities. For example, a sensing apparatus can include a photo-detecting unit configured to absorb a first incident light at a first wavelength to generate a first detecting signal and a second incident light at a second wavelength to generate a second detecting signal. In some implementations, the photo-detecting unit can include a near-infrared or short-wave infrared sensor. In some implementations, the photo-detecting unit can include germanium. The sensing apparatus can further be configured to determine a calculating result according to the first detecting signal and the second detecting signal. The sensing apparatus can further be configured to perform an adjustment to one or more functionalities associated with a sensing apparatus according to the calculating result. For example, in response to detecting skin (e.g., body tissue of a hand holding the sensing apparatus), the sensing apparatus can adjust from a low-power operational mode to a normal power operational mode.

The devices, systems, and methods of the present disclosure can provide a number of technical effects and benefits. For example, for developing more wideband sensing applications, this disclosure provides a sensing apparatus with wideband sensor to enable novel environment/context awareness (e.g., bio-identification, 3D reconstruction, gesture/skeleton detection, target characterization or user scenario definition) and provide further useful applications (e.g., unlock/payment authentication, navigation, user interface (UI)/posture monitoring and RF signal/power optimization).

Moreover, the devices, systems, and methods of the present disclosure can allow for improved accuracy in object classification by leveraging reflectivity data at various wavelengths to perform material analysis. For example, in some implementations, reflectivity data at various wavelengths can be used as an input into a machine-learned model to determine a material type of an object (e.g., wood, skin, etc.) and/or one or more properties associated with a material (e.g., a blood glucose level, etc.). In some implementations, additional inputs, such as image data, point cloud data, or other data can also be input into a machine-learned model to further improve object classification analysis.

Moreover, the devices, systems, and methods of the present disclosure can allow for optical spectroscopy analysis by measuring reflectivity data of a target object at various wavelengths to achieve the same function of near-infrared spectroscopy to determine one or more properties of the target object including a moisture content of the target object, an amount of carbohydrates in the target object, a sugar content in the target object, a protein content of the target object, or a fat content of the target object. Optical spectroscopy (e.g., near-infrared spectroscopy) is useful in food industry for monitoring and assessing food items. For example, such optical spectroscopy analysis can be useful when determining whether the target object (e.g., a piece of fruit) is a counterfeit. A low-cost, image-sensor based near-infrared spectroscopy can be monolithically implemented using GeSi image sensor array with monolithic bandpass filters.

The systems and methods of the present disclosure can also allow for more immersive augmented reality (AR) and virtual reality (VR) experiences. For example, by identifying a material type of an object, user interactions with the object in an AR/VR experience can be tailored based on the material type. In turn, this can allow for both more realistic interactions (e.g., based on physical laws) as well as fantastic interactions (e.g., based on software-defined rules and not physical laws).

Moreover, the systems and methods of the present disclosure can allow for improved safety of a sensing apparatus. For example, by improving the accuracy of object classification, downstream analyses, such as task performance by an automated device (e.g., vehicle, robot, etc.), can be improved. This in turn can increase the safety for bystanders (e.g., nearby pedestrians). Additionally, in implementations in which a germanium based wideband sensor according to example aspects of the present disclosure is used, light wavelengths in the near-infrared (NIR, e.g., wavelength range from 780 nm to 1400 nm, or any similar wavelength range as defined by a particular application) and short-wave infrared (SWIR, e.g., wavelength range from 1400 nm to 3000 nm, or any similar wavelength range as defined by a particular application) spectrum can be detected. This can more readily allow for Maximum Permissible Exposure (MPE) constraints used to protect bystanders' eyes in the visible spectrum to be satisfied while allowing for higher power light devices (e.g., lasers) to be used.

With reference to the figures, example embodiments of the present disclosure will be discussed in further detail. FIG. 1 illustrates a sensing apparatus 100 including a wideband sensor 102, a calculation circuit 104 and an adjustment circuit 106. The wideband sensor 102 can be configured to absorb a first incident light IL1 having a first wavelength to generate a first detecting signal and a second incident light IL2 having a second wavelength to generate a second detecting signal. The first detecting signal and the second detecting signal can be the electrical signals generated by the photodetectors inside the wideband sensor 102. An example wideband sensor 102 and an example portion thereof according to example aspects of the present disclosure is described in greater detail with respect to FIGS. 10 and 11.

Furthermore, the wideband sensor 102 may output a sensor output signal SO according to the first detecting signal and the second detecting signal. In some embodiments, the sensor output signal SO can be a digital data stream, which could include information about the first detecting signal and the second detecting signal, such as depth information, calibration information, error correction code (ECC) information, magnitude information and so forth.

The calculation circuit 104, coupled to the wideband sensor 102, can be configured to output a calculating result ED according to the sensor output signal SO; and an adjustment circuit 106, coupled to the calculation circuit 104, can be configured to perform an adjustment according to the calculating result ED.

In some embodiments, the first wavelength and the second wavelength can be different, which could be 850 nm/905 nm/940 nm/1050 nm/1064 nm/1310 nm/1350 nm/1400 nm/1550 nm and/or any other suitable wavelength to perform the sensing.

In some embodiments, the wideband sensor 102 can be implemented by direct ToF, indirect ToF and/or structured-light sensing technologies. For example, a direct ToF sensor can transmit a pulsed light (e.g., from a laser, diode, etc.) to an object and detect the time-of-arrival of a reflected pulse. For example, a photodetector can detect the reflected pulse, and supporting electronics can determine a distance to the object (or a portion thereof) based on the time-of-arrival of the reflected pulse. In some implementations, a plurality of light pulses can be transmitted and a corresponding plurality of reflected pulses can be detected by the photodetector(s). In some implementations, the supporting electronics can perform analysis (e.g., a histogram analysis) of the reflected pulse(s) to determine a three-dimensional representation of the object (e.g., a point cloud).

As another example, an indirect ToF sensor can emit a modulated light pulse that has a particular period. The period of the wave can be used to determine the distance it takes for an emitted wave to complete a full cycle. For example, a sinusoidal light wave or a square wave can be emitted and the phase difference (e.g., phase shift) between an outgoing signal (e.g., transmitted light) and an incoming signal (e.g., reflected light detected by the photodetector(s)) can be used to determine a distance to an object.

In some embodiments, the calculation circuit 104 can be implemented by application specific integrated circuit (ASIC), digital signal processing (DSP) processor or general-purpose processor, which may perform artificial intelligence (AI) or deep learning calculation (e.g., one or more machine-learned models).

In some embodiments, the adjustment circuit 106 can be implemented by hardware, firmware or software to adjust one or more functionalities (e.g., switching ON/OFF the RF/power/display units) of the sensing apparatus 100. In some other implementations, the adjustment circuit 106 can be implemented to generate one or more output signals to another circuitry of the sensing apparatus 100 to adjust one or more functionalities of the sensing apparatus 100. In some other implementations, the adjustment circuit 106 can be implemented to generate one or more output signals to another device to adjust one or more functionalities of such device.

Figure 2:
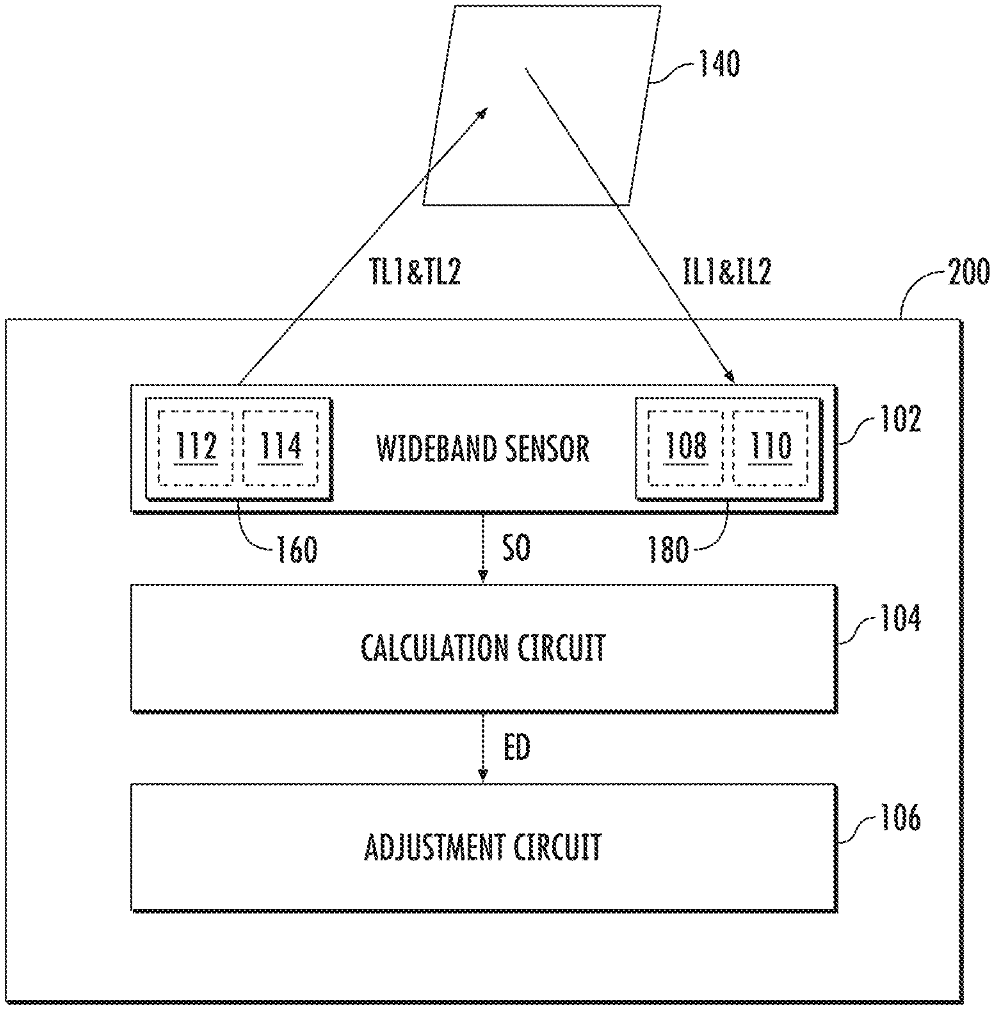
FIG. 2 depicts a block diagram of an example structure for a sensing apparatus according to example aspects of the present disclosure.

FIG. 2 illustrates a sensing apparatus 200 including the wideband sensor 102, the calculation circuit 104 and the adjustment circuit 106, where the wideband sensor 102 is configured to emit a first transmitting light TL1 having a first wavelength and a second transmitting light TL2 having a second wavelength. The wideband sensor 102 includes a light-emitting unit 160 (also referred to as a light source circuit) and a photo-detecting unit 180. The light-emitting unit 160 may include multiple light sources (e.g., light source 112 and light source 114) and the photo-detecting unit 180 may include one or more photodetectors (e.g., photodetector 108 and photodetector 110). In some embodiments, one or more photodetectors of the photo-detecting unit 180 may be a photodetector for three-dimensional (3D) depth sensing (e.g., i-TOF or d-TOF photodetector), proximity sensing, optical spectroscopy, two-dimensional (2D) sensing (e.g., 2D IR imaging), or a combination thereof. Each of the photodetector 108 and photodetector 110 can be implemented using a single photodetector or an array of photodetector pixels (e.g., 1D or 2D photodetector array as described in reference to FIGS. 29A and 29B).

In some embodiments, the first transmitting light TL1 and the second transmitting light TL2 are emitted by the light source 112 and light source 114 respectively, where the light source 112 and light source 114 can be implemented by laser (e.g., VCSEL) or light emitting diode (LED).

In some embodiments, the photodetector 108 can be configured to absorb the first incident light IL1 having the first wavelength (e.g., 940 nm) and the photodetector 110 can be configured to absorb the second incident light IL2 having a second wavelength (e.g., 1350 nm). The sensor output signal SO can be a digital data stream, which may include depth information, calibration information, error correction code (ECC) information, magnitude information and so forth. The first incident light IL1 can be a portion of the first transmitting light TL1 reflected by the object 140. The second incident light IL2 can be a portion of the second transmitting light TL2 reflected by the object 140. In some embodiments, the light absorption material used in the photodetector 108 can be silicon and the light absorption material used in the photodetector 110 can be germanium or III-V group. In some other embodiments, the light absorption material used in both the photodetector 108 and the photodetector 110 can be the same (e.g., germanium or III-V group).

As the reflectivity of the first wavelength and the reflectivity of the second wavelength are dependent on the object 140, the magnitude of the first detecting signal detected by the photodetector 108 and the magnitude of the second detecting signal detected by the photodetector 110 may be different. In some implementations, the calculation circuit 104 can be configured to calculate a ratio of the first magnitude and the second magnitude as the calculating result ED. In some embodiments, the calculation circuit 104 can be configured to calculate a difference of the first magnitude and the second magnitude. The calculating result ED calculated by the calculation circuit 104 can be provided to the adjustment circuit 106 for performing further adjustments.

Figure 3:
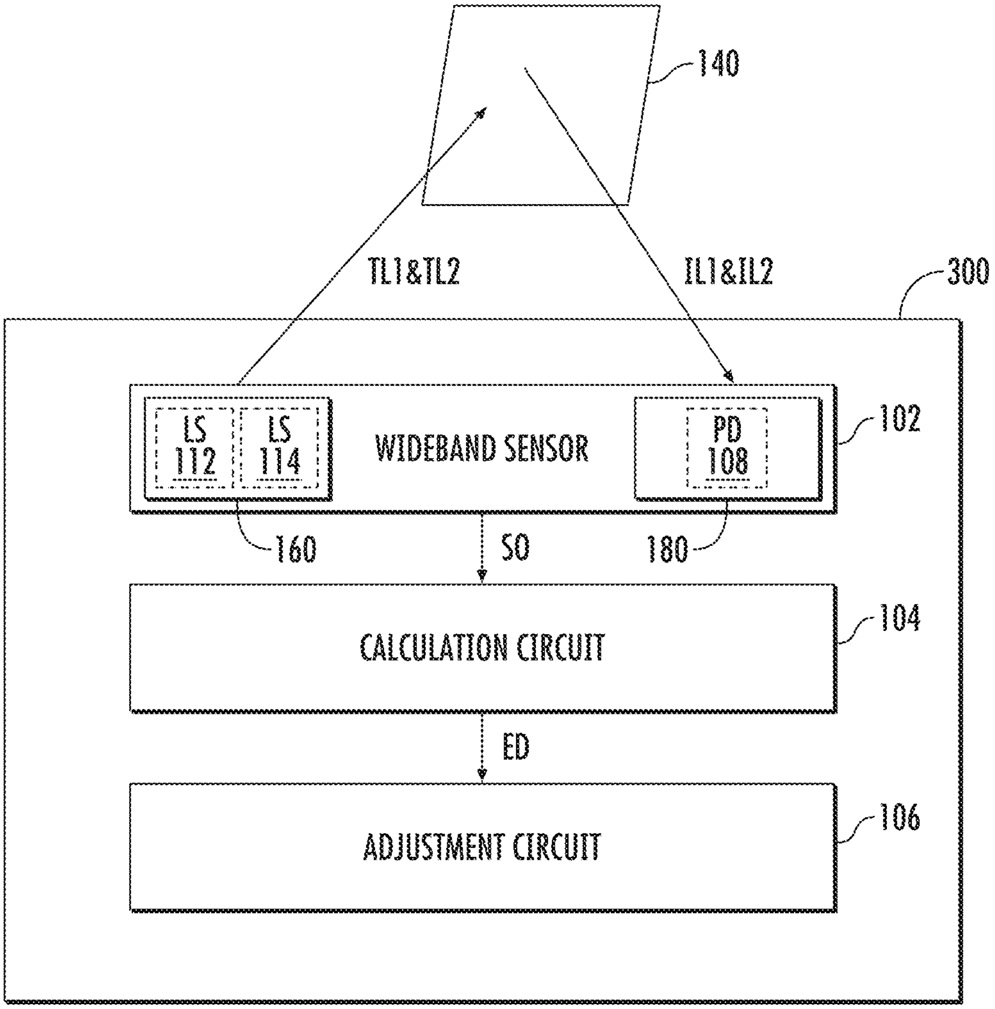
FIG. 3 depicts a block diagram of an example structure for a sensing apparatus according to example aspects of the present disclosure.

FIG. 3 illustrates an embodiment of a sensing apparatus 300. One may use a single photodetector 108 to absorb both the first incident light IL1 and the second incident light IL2 at different timing. For example, during a first time period t1-t2, the photodetector 108 may absorb the first incident light IL1 having the first wavelength (e.g., 940 nm) and during a second time period t3-t4, the photodetector 108 may absorb the second incident light IL2 having the second wavelength (e.g., 1350 nm). In this way, a single photodetector 108 can be configured to detect both the first incident light IL1 and the second incident light IL2.

Figure 4:
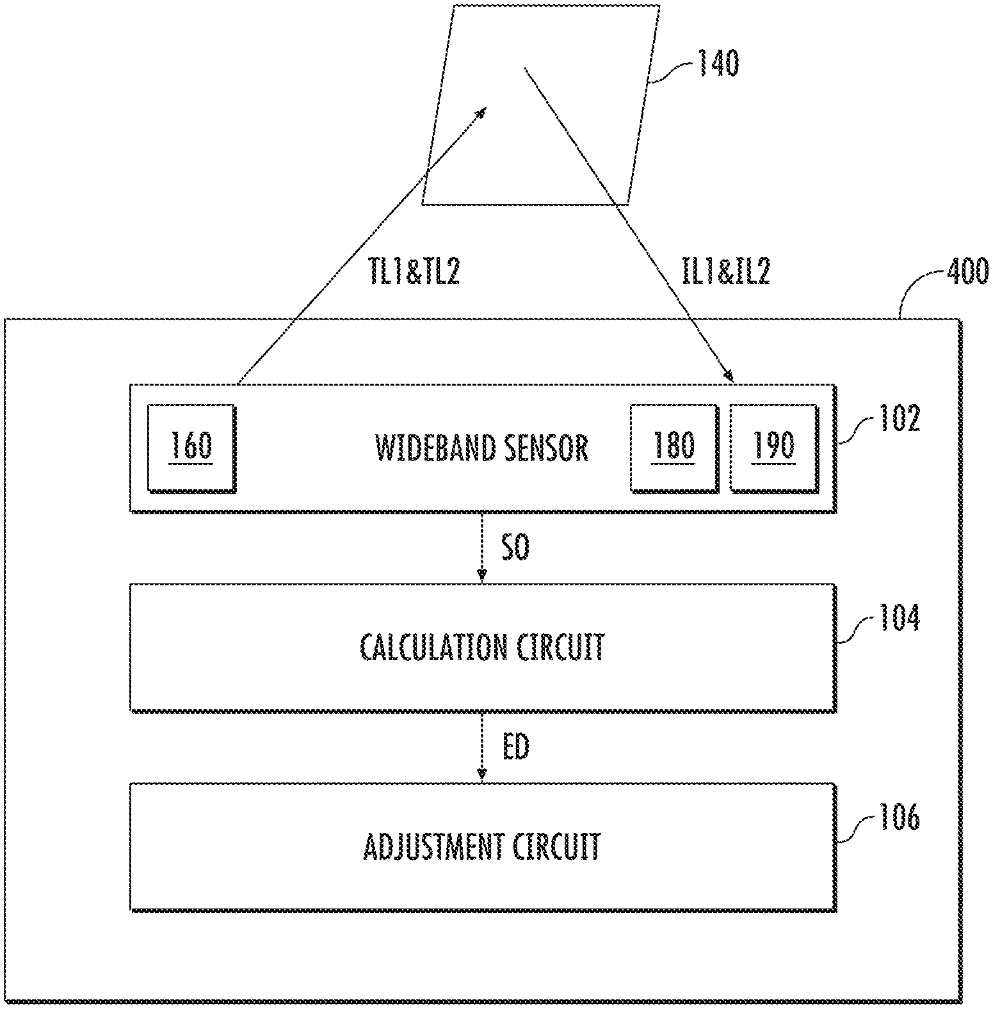
FIG. 4 depicts a block diagram of an example structure for a sensing apparatus according to example aspects of the present disclosure.

FIG. 4 illustrates an embodiment of a sensing apparatus 400, which includes a second photo-detecting unit 190 (e.g., a silicon-based RGB camera) to generate an 2D image which can enhance the recognition of an object 140, where the second photo-detecting unit 190 may include one or more 2D photodetectors. Based on this architecture, the calculation circuit 104 can obtain the information according to the photo-detecting unit 180 and obtain the information according to the photo-detecting unit 190. Therefore, the sensing apparatus 400 can process more information to enhance the recognition of an object 104. For example, the 2D image detected by the photo-detecting unit 190 as well as the first incident light IL1 and the second incident light IL2 detected by the photo-detecting unit 180 can be provided as the SO to the calculation circuit 104, which in some implementations can use one or more machine-learned models (e.g., AI) to detect and classify the object 140.

In some embodiments, when there is only one photodetector 108 implemented in the photo-detecting unit 180, the photodetector 108 can absorb the first incident light IL1 and the second incident light IL2 at different time periods.

Figure 5:
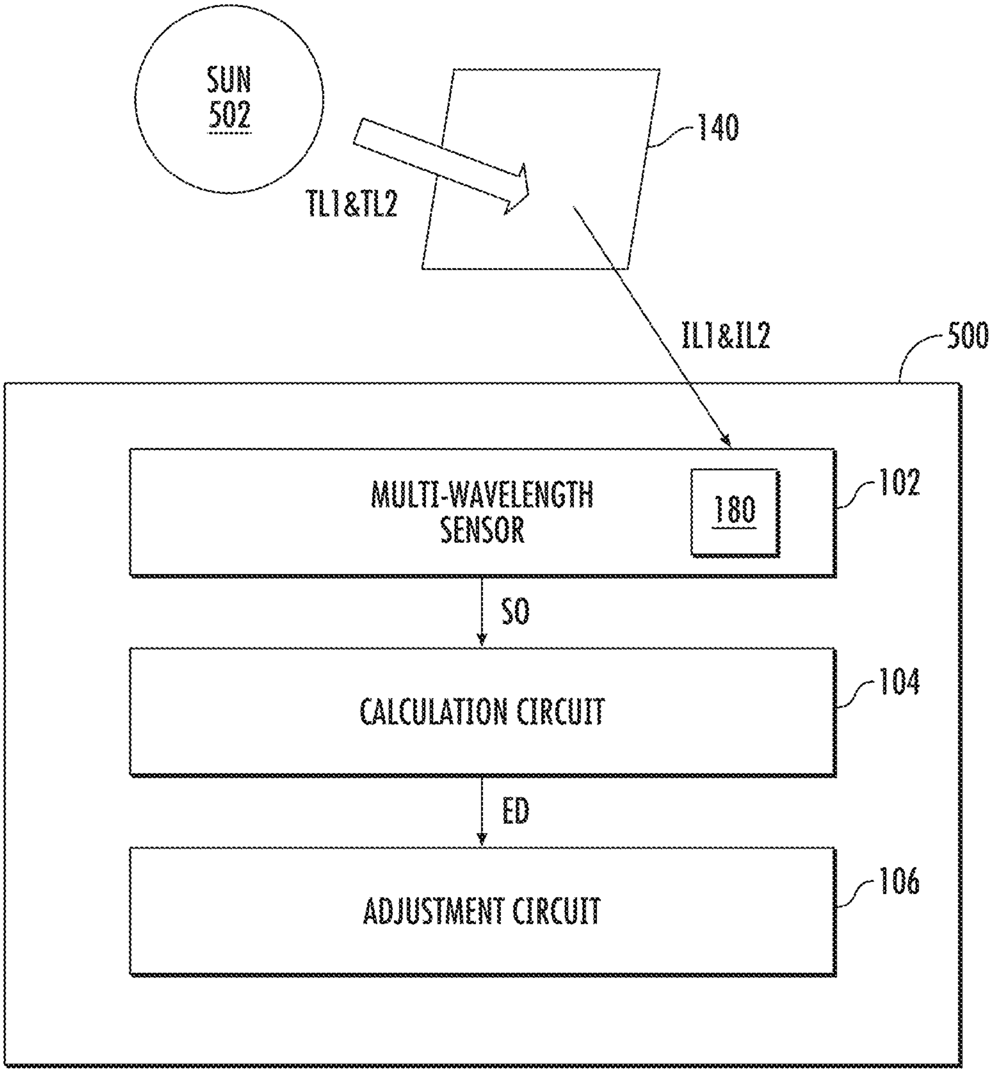
FIG. 5 depicts a block diagram of an example structure for a sensing apparatus according to example aspects of the present disclosure.

FIG. 5 illustrates an embodiment of a sensing apparatus 500. In this embodiment, the sunlight emitted by the sun 502 can be used as transmitting lights. As shown in FIG. 5 the sunlight includes a first transmitting light TL1 having a first wavelength (e.g., 940 nm) and a second transmitting light TL2 having a second wavelength (e.g., 1050 nm), which can be reflected by the object 140 and then be absorbed by the photo-detecting unit 180. Compared with previous embodiments, the light-emitting unit 160 can be optionally removed in implementations in which sunlight is used as the transmitting lights TL1 and TL2. Similarly, photo-detecting unit 180 may include one or more photodetectors to detect the first transmitting light TL1 and the second transmitting light TL2. In some embodiments, the sensing apparatus 500 can also use ambient lights as the transmitting lights, which will also be reflected by the object 140 and to be as the first incident light IL1 and the second incident light IL2. In these embodiments that the first incident light IL1 and the second incident light IL2 are not modulation signals, the photo-detecting unit 180 can be used as a near-infrared (NIR) sensor or a short-wave infrared (SWIR) sensor to sense the magnitudes of the first incident light IL1 and the second incident light IL2, such that the sensing apparatus 500 can determine the material of the object 140 or proceed with other applications.

Figure 6:
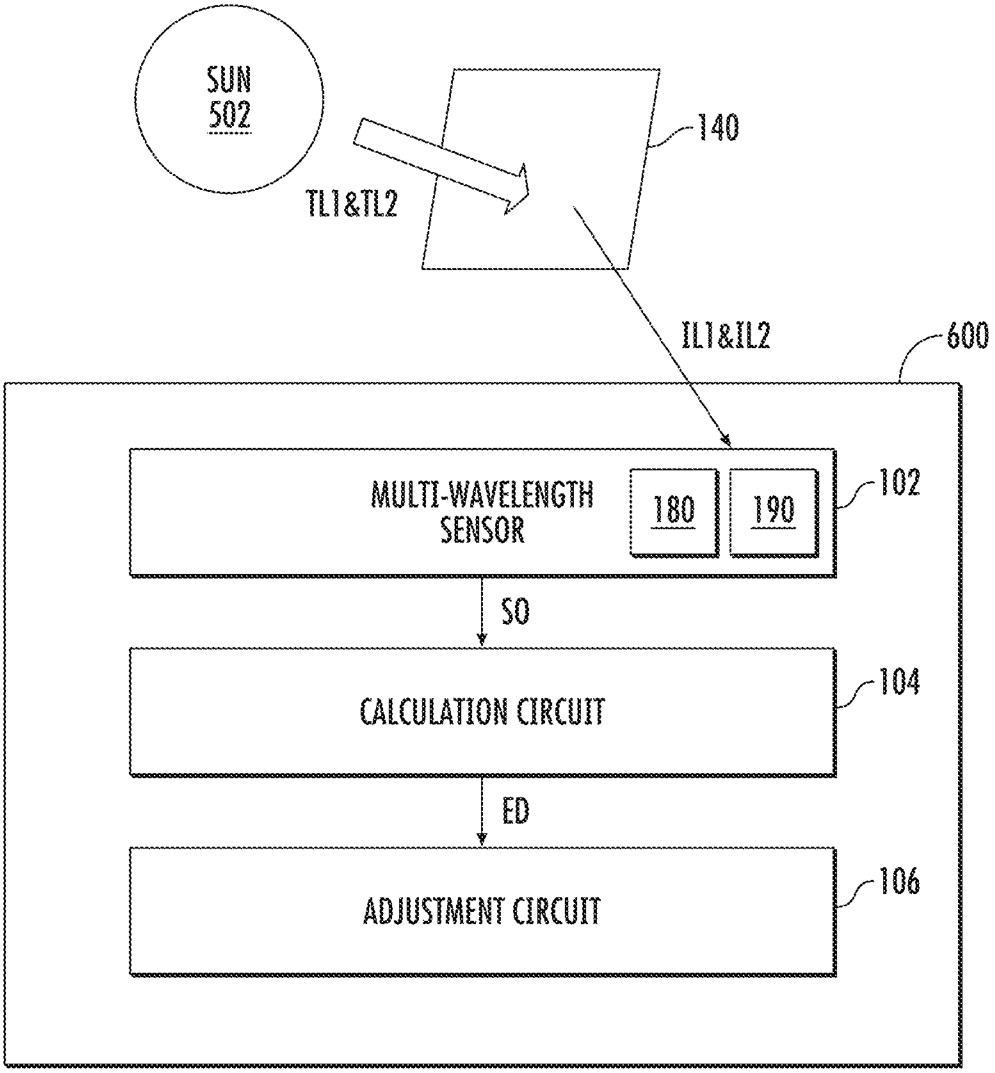
FIG. 6 depicts a block diagram of an example structure for a sensing apparatus according to example aspects of the present disclosure.

FIG. 6 illustrates an embodiment of a sensing apparatus 600. In this embodiment, a photo-detecting unit 190 can be added to generate an 2D image to enhance the recognition, where the photo-detecting unit 190 may include one or more 2D photodetectors. Based on this architecture, the calculation circuit 104 can obtain the information according to the photo-detecting unit 180 and obtain the information according to the photo-detecting unit 190. Therefore, the sensing apparatus 600 can have more information to process and enhance the recognition of an object 140. In implementations in which the first incident light IL1 and the second incident light IL2 are not modulation signals, the photo-detecting unit 180 can be used as a near-infrared (NIR) sensor or a short-wave infrared (SWIR) sensor to sense the magnitudes of the first incident light IL1 and the second incident light IL2, such that the sensing apparatus 600 can determine the material of the object 140 or proceed with other applications.

In connection with any embodiments disclosed herein, in some embodiments, the modulation frequencies of the first transmitting light TL1 and the second transmitting light TL2 can be changed dynamically. For example, during a first time period t1-t2, the modulation frequencies of the first transmitting light TL1 and the second transmitting light TL2 can be 300 MHz and during a second time period t3-t4, the modulation frequencies of the first transmitting light TL1 and the second transmitting light TL2 can be 50 MHz.

In some embodiments, one may use single light source 112 (e.g., no light source 114 implemented) with dynamic modulation frequencies to emit the first transmitting light TL1 and the second transmitting light TL2.

Figure 7:
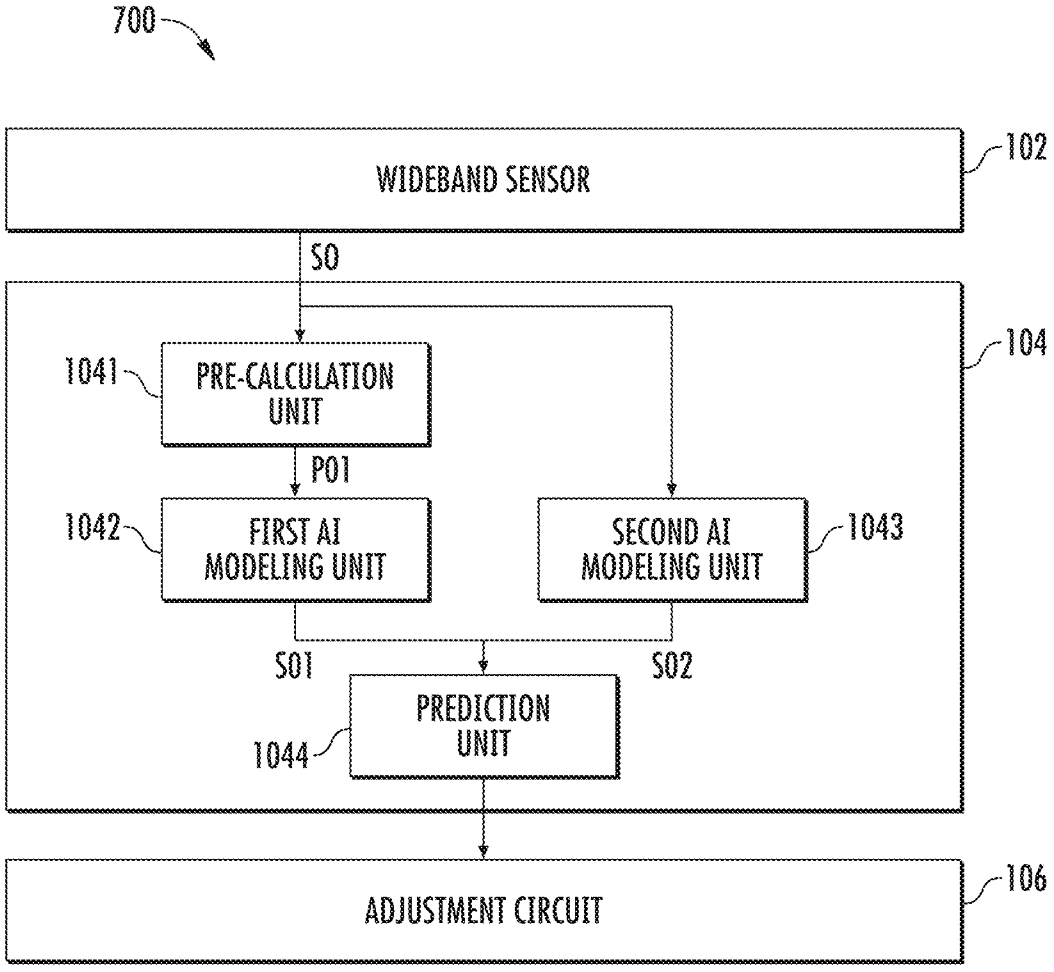
FIG. 7 depicts a block diagram of an example structure for a sensing apparatus with computer vision according to example aspects of the present disclosure.

FIG. 7 illustrates an embodiment of a sensing apparatus 700. In this embodiment, the calculation circuit 104 can be configured to perform one or more computer vision techniques (e.g., object recognition/classification, object tracking, etc.). For example, in some implementations, the calculation circuit 104 can include a pre-calculation unit 1041, a first AI modeling unit 1042, a second AI modeling unit 1043, and a prediction unit 1044. In some embodiments, the pre-calculation unit 1041 can be configured to perform integral or differential calculations on the sensor output signal SO and output a pre-calculation result P01 to the first AI modeling unit 1042 (e.g., a first machine-learned model). In other words, the pre-calculation unit 1041 can be configured to obtain the integral or differential information in different wavelengths so that the first AI modeling unit 1042 is able to perform image data analysis and output a first modeling signal S01. In some embodiments, the integral or differential information can be transformed to frequency domain (e.g., wavelet transform). This information can be a data seed with label for AI training data. Furthermore, the sensor output signal SO can also be provided to the second AI modeling unit 1043 (e.g., a second machine-learned model) so that the second AI modeling unit 1042 is able to perform image data analysis and output a second modeling signal S02. The prediction unit 1044 can be configured to predict some statuses according to the first modeling signal S01 and/or the second modeling signal S02. For example, the prediction unit 1044 can predict a classification of the object 140, the material of the object 140, the behavior of the user using the sensing apparatus 700 and/or health data. Lastly, the prediction result predicted by the prediction unit 1044 can be used as the calculating result ED outputted to the adjustment circuit 106. Other types of machine-learned models and network architectures can similarly be used to perform analysis of detecting signals obtained with 2D and/or 3D wideband sensors described herein.

An advantage provided by a sensing apparatus 700 according to example aspects of the present disclosure is the ability to more accurately perform computer vision analysis on objects 140. For example, in a typical computer vision implementation, one or more machine-learned models may use various segmentation techniques (e.g., bounding boxes) on a two-dimensional image to perceive objects 140 in an environment. Similarly, three-dimensional data, such as data obtained from a ToF sensor (e.g., a LIDAR sensor) can be used to identify and track objects 140 in three-dimensional space. However, such computer vision techniques may classify or track such objects 140 based on the object's shape (e.g., segmented boundaries in two-dimensional or three-dimensional space). Thus, objects which have a similar shape to other objects may be prone to being misclassified using such computer vision techniques. Additionally, this can cause incorrect inferences to be drawn about the anticipated behavior of an object 140 in subsequent analyses. For example, classifying an object 140 as a stationary object type (e.g., a statue) when the object is not stationary (e.g., a pedestrian) may cause downstream analyses to determine incorrect predictions about the object's future movement.

The sensing apparatuses according to example aspects of the present disclosure, however, can enable more accurate computer vision analysis by allowing for additional information, such as data indicative of a material type, to be included as an input into a machine-learned model. For example, a sensor output SO can include incident light at various wavelengths (e.g., IL1, IL2) reflected by an object 140. The reflectivity of the incident light at the various wavelengths (e.g., IL1, IL2) can be indicative of a material type of the object 140.

Figure 8:
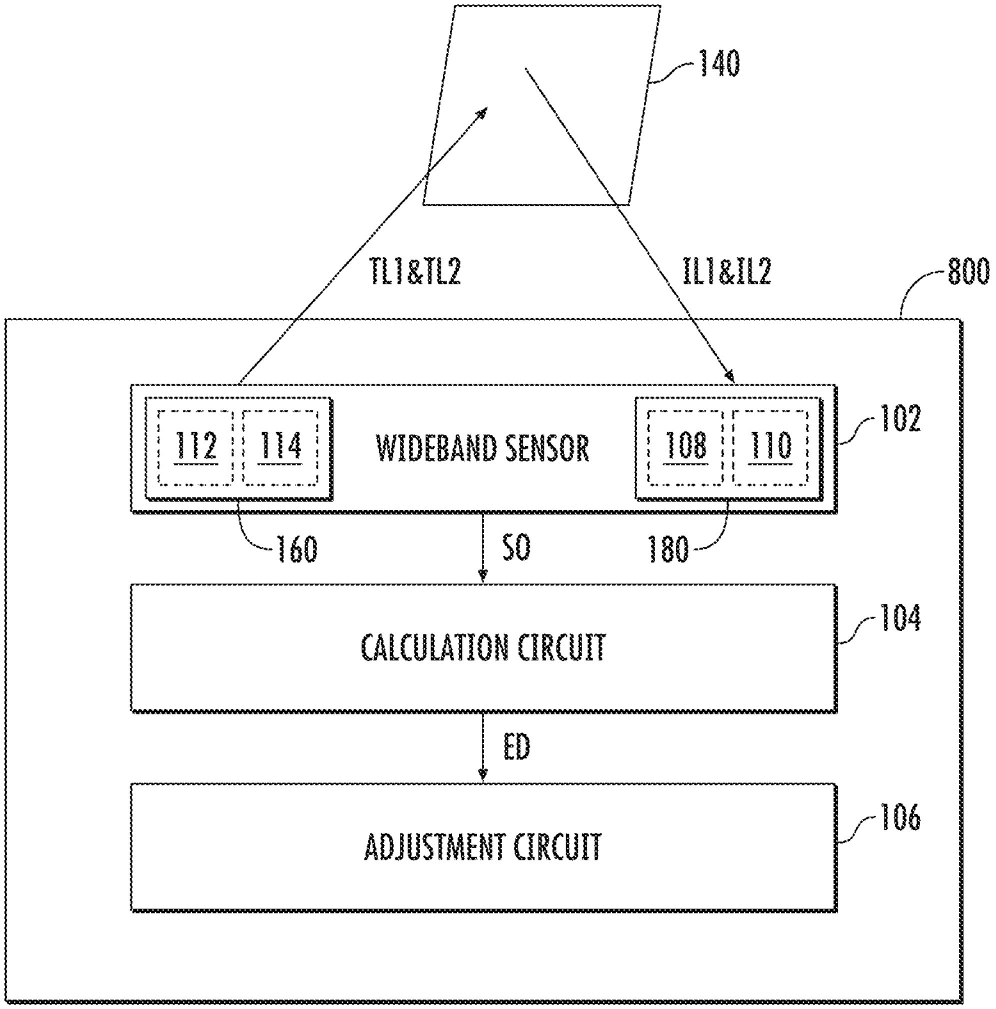
FIG. 8 depicts an example implementation of a wideband application of a sensing apparatus according to example aspects of the present disclosure.

For example, referring now to FIG. 8, an embodiment of a wideband application of a sensing apparatus 800 is illustrated. In connection with any embodiments disclosed herein, the sensing apparatus 800 can be a cell phone or any other devices having cellular functionalities, where the sensing apparatus 800 could be operated in a number of environments, such as placed on a surface (e.g., a table) or be held in hand. As an example, when the cell phone (or other device 800) is placed on a table (e.g., an object 140), a material type of the object 140 could be a type of wood. In such an environment, the first transmitting light TL1 having a first wavelength (e.g., 940 nm) may have a first reflectively (e.g., 90%) on the object 140 and a second transmitting light TL2 having a second wavelength (e.g., 1550 nm) may have a second reflectively (e.g., 85%). In this scenario, the first reflectively and the second reflectively are relatively close, and the first magnitude of the first detecting signal detected by the photodetector 108 and the second magnitude of the second detecting signal detected by the photodetector 110 are also relatively close. The calculation circuit 104 can obtain a calculating result ED between the first magnitude and the second magnitude. In one embodiment, calculating result ED can be the ratio of the first magnitude and the second magnitude. Consequently, the adjustment circuit 106 can perform an adjustment (e.g., switching ON/OFF the RF/power/display units/software applications) for the sensing apparatus 800 based on the calculating result ED. For example, when a material type of the object 140 is determined to be wood, the sensing apparatus 800 can enter into a low power mode. Additionally, or alternatively, one or more applications running on the associated device can be adjusted and/or closed. This can include, for example, stopping and/or closing an application for playing music, a social media application, etc. This can also help with saving power resources.

As another example, when the cell phone (or other device 800) is held in a hand, a material type of the object 140 may be skin (e.g., a body tissue). In such an environment, the first transmitting light TL1 having a first wavelength (e.g., 940 nm) may have a first reflectively (e.g., 80%) on the object 140 and a second transmitting light TL2 having a second wavelength (e.g., 1550 nm) may have a second reflectively (e.g., 50%). In this scenario, the first reflectively and the second reflectively are not relatively close (e.g., within a threshold percentage of one another), and the first magnitude EN1 and the second magnitude EN2 are also not relatively close. The calculation circuit 104 can obtain a calculating result ED (e.g., a ratio) between the first magnitude EN1 and the second magnitude EN2. In one embodiment, the calculating result ED can be the first magnitude EN1 and the second magnitude EN2. In response to detecting skin (or other type of material), the adjustment circuit 106 can perform an adjustment (e.g., switching ON/OFF the RF/power/display units/software applications) for the sensing apparatus 800 based on the calculating result ED. By way of example, a software application related to acquiring image data (e.g., fingerprint detection or verification) can be launched for the user based on the detection of skin. Additionally, or alternatively, one or more other applications can be launched (e.g., a passcode entry prompt, music application) or closed based on the detection of skin. In this way, the type of material of an object 140 detected by the sensing apparatus 800 can be used to determine an adjustment performed by the adjustment circuit 106. Other types of adjustments can similarly be performed.

Therefore, it is understood that when the sensing apparatus 800 is used in different environments (e.g., around objects of different material types), the calculating result ED generated by the calculation circuit 104 will also be different. As such, the adjustment circuit 106 can perform an adjustment (e.g., switching ON/OFF the RF/power/display units) of the sensing apparatus 800. For example, when the sensing apparatus 800 is put on the table, the sensing apparatus 800 can be operated in low power mode, launch or close application(s), etc. On the contrary, when the sensing apparatus 800 is held in hand, the sensing apparatus 800 can be operated in normal power mode, launch or close application(s), etc. By using this approach, the power consumption of the sensing apparatus 800 can be dynamically adjusted, such as in response to detecting objects of different material types.

Notably, the adjustment circuit 106 configured to adjust power is an example. The adjustment circuit 106 may proceed with other operations (e.g., adjust the brightness of the screen, unlock the screen and access permission, etc.) based on the design requirements.

Figure 9:
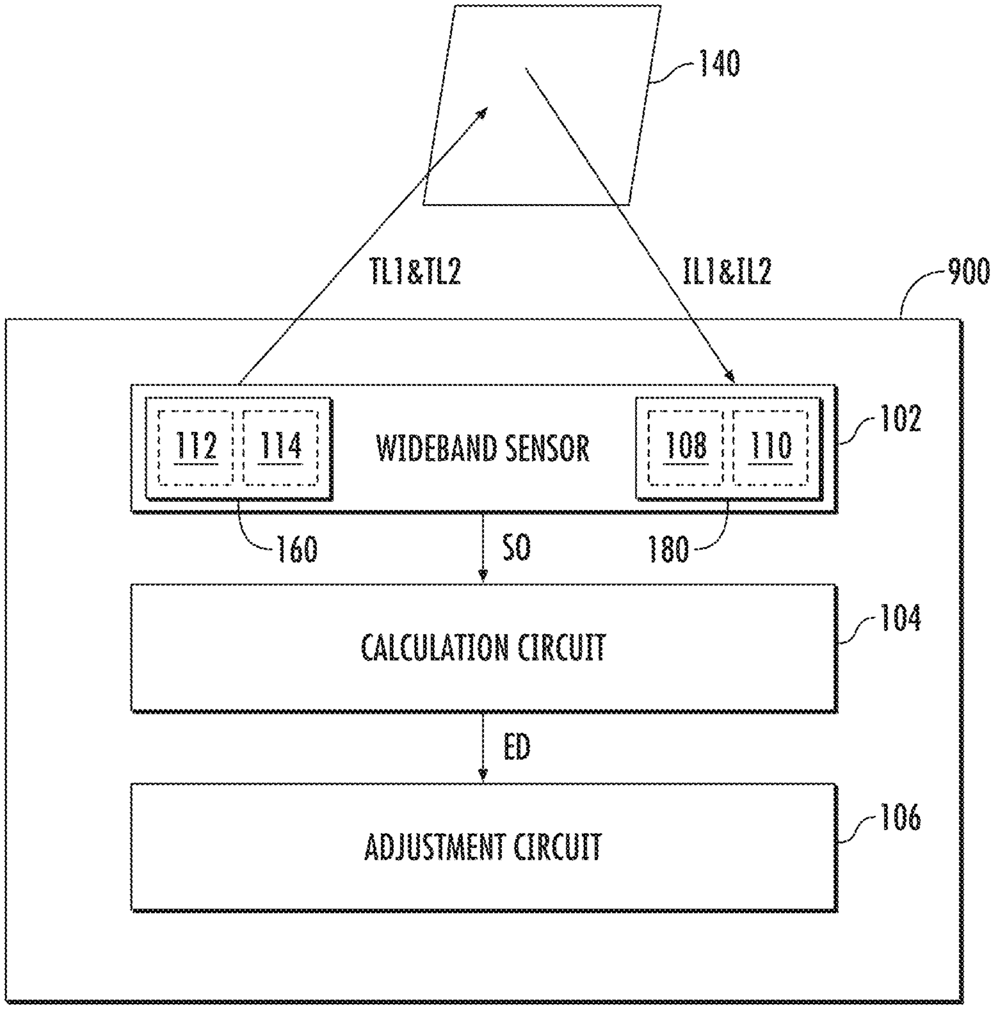
FIG. 9 depicts an example implementation of a wideband application of a sensing apparatus according to example aspects of the present disclosure.

As another example, FIG. 9 illustrates an embodiment of wideband application of a sensing apparatus 900. In this example, the sensing apparatus 900 can be a health/medical device, where the light source 112 and the light source 114 respectively emits the first transmitting light TL1 having a first wavelength (e.g., 940 nm) and a second transmitting light TL2 having a second wavelength (e.g., 1350 nm) to the object 140. For example, the object 140 may be skin (e.g., body tissue). As most of the second transmitting light TL2 will be absorbed by a material with water, but most of the first transmitting light TL1 will be reflected, the calculation circuit 104 can calculate a blood glucose based on the first incident light IL1 and the second incident light IL2 detected by the photodetector 108 and the photodetector 110. In this way, one or more properties of an object (e.g., blood glucose levels of a body tissue) can be determined. Further, once such a property has been determined, such as upon obtaining the blood glucose level, the value can be shown (e.g., displayed) on a panel/monitor through the adjustment circuit 106.

In another example, the detection of a certain material can activate on or more functions or outputs from a medical device. For instance, one or more properties of an object (e.g., skin blemishes, psoriatic plaques on a human body) can be determined based on the first incident light IL1 and the second incident light IL2 detected by the photodetector 108 and the photodetector 110 in a similar manner described herein. Based on the detected properties, a function of a medical device (e.g., laser, diagnostic tool) can be activated to address certain parts of an object (e.g., apply laser treatment to unhealthy skin).

In addition to cell phone and health/medical device implementations, the sensing apparatuses disclosed in the present disclosure can be other devices, such as wearable watch, keychain, earphone, portable laptop, sports cam, drone, vehicle computing system, and/or any other device which includes one or more wideband sensors. For example, in an autonomous vehicle implementation, the wideband sensing apparatuses can be used to more accurately perform object classification and prediction, such as by a vehicle computing system. For example, the sensor output signal SO from a wideband sensor 102 can include various data, such as image data from a 2D photodetector (e.g., camera) and/or a 3D photodetector (e.g., ToF sensor, iToF sensor, structured light sensor, etc.), which can include incident light (e.g., IL1, IL2) at various wavelengths. In some implementations, the sensor output signal SO can be provided to one or more machine-learned models, which can use the data in the sensor output signal SO to more accurately classify objects 140 and predict trajectories for the objects 140. As an example, the reflectivity of the incident light at various wavelengths can indicate a material type of the object 140, which can be used to determine a classification of the object 140. For example, as described herein, the reflectivity of the incident light at different wavelengths can indicate whether a humanoid-shaped object 140 should be classified as a statue (e.g., such as an object consisting of stone, metal, wood, etc.) or as a pedestrian (e.g., an object consisting skin or other body tissue, fabric, clothing, etc.). This, in turn, can be used by a vehicle computing system to make more accurate trajectory prediction analyses for the object 140, by for example, determining whether an object is likely to remain stationary or move within the environment. Further, the trajectory prediction analyses can be used to determine a motion plan for a vehicle, which can be implemented by a vehicle controller (e.g., an adjustment circuit 106).

The sensing apparatuses according to example aspects of the present disclosure can also allow for more immersive augmented reality (AR) and virtual reality (VR) experiences. For example, a personal computing device (e.g., cell phone) can include one or more wideband sensors 102 to detect various objects 104 in a user's environment. As described herein, the wideband sensor 102 can provide a sensor output SO to a calculation circuit 104, which in some implementations can include one or more machine-learned models (e.g., AI modeling units). The sensor output SO can include reflectivity data at various wavelengths, which can be used by the calculation circuit 104 to determine a respective type of material for objects 104 in the environment of the user. Further, the calculation circuit 104 can determine one or more possible user interactions with an object 104 in an AR/VR environment based at least in part on the material type of the object 104. As examples, objects 104 which are made of pliable materials (e.g., flexible plastic, rubber, etc.) can be bent, stretched, etc.; objects 104 which are made of brittle materials (e.g., glass, ceramic, etc.) can be broken or destroyed; and/or objects which are made of rigid materials (e.g., metal, wood, etc.) can be deformed, dented, split, etc. in response to a user interaction. For example, the calculation circuit 104 can determine an augmented AR/VR experience with an object 104 in response to a user interaction as a calculating result ED based at least in part on the material type of the object 104, and an adjustment circuit 106 can present the augmented AR/VR experience to a user based on the calculating result ED.

The apparatuses (e.g., phone) according to example aspects of the present disclosure can also allow for optical spectroscopy analysis. For example, a personal computing device (e.g., cell phone) can include one or more wideband sensors 102 to detect various objects 104 such as food (e.g., fruits). As described herein, the wideband sensor 102 can provide a sensor output SO to a calculation circuit 104, which in some implementations can include one or more hardware or software processing capabilities. The sensor output SO can include reflectivity data at various wavelengths, which can be used by the calculation circuit 104 to determine a respective property for the objects 104 (e.g., the moisture content, the amount of carbohydrates and sugars, the protein content, and/or the fat content of a piece of fruit). The adjustment circuit 106 can then use the property of the objects 104 to determine the authenticity of food. For example, the adjustment circuit 106 may compare the measured sugar content of the fruit with a reference value, and if the difference in the sugar content exceeds a threshold value, the adjustment circuit 106 may determine that the fruit is a counterfeit.

Referring generally now to FIGS. 15-28, several packaging implementations for a sensor 102 and/or components thereof are depicted. While the packaging implementations and/or components thereof depicted in FIGS. 15-28 depict specific implementations, aspects of the various packaging implementations can be adapted, rearranged, expanded, omitted, and/or combined to produce additional packaging implementations. The packaging implementations and/or components thereof for the sensors 102 depicted in FIGS. 15-28 can be used, for example, in a sensing apparatus 100 as described herein.

Figure 15:
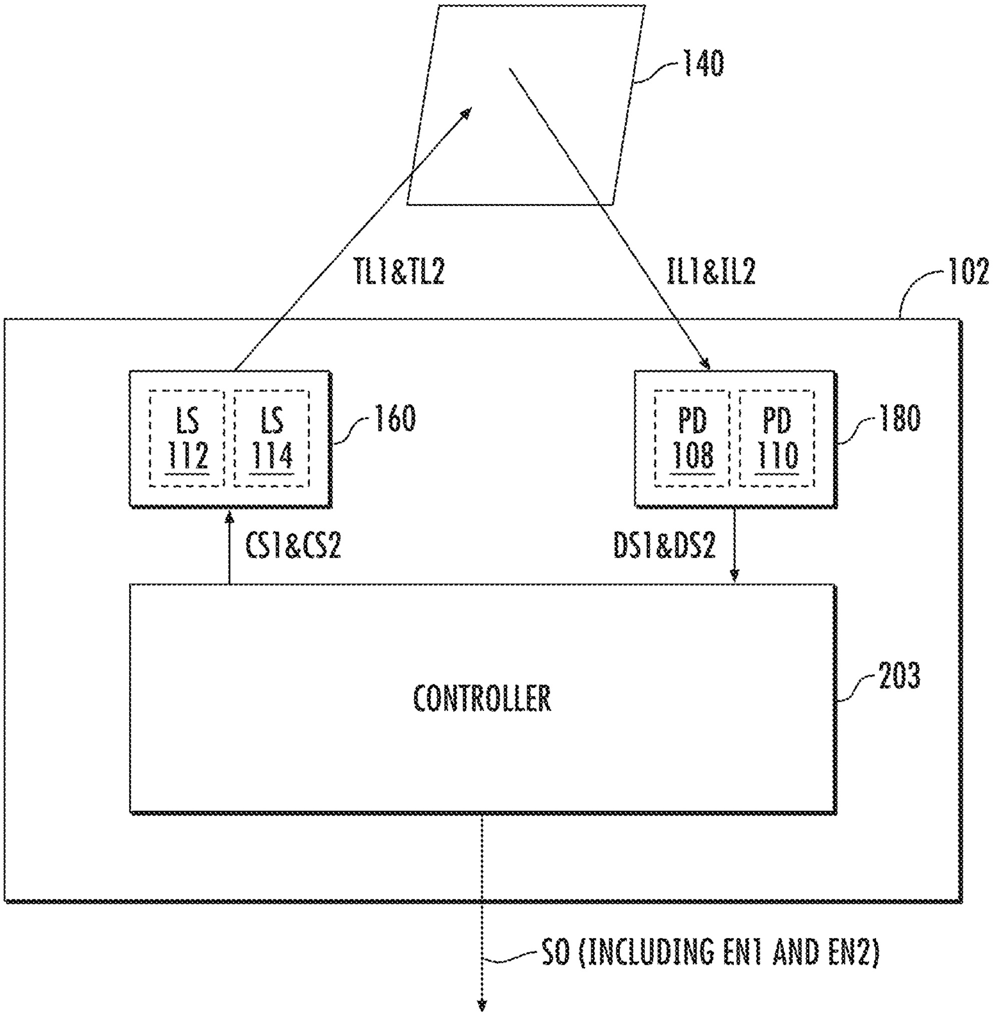
FIG. 15 depicts a block diagram of an example sensor according to example aspects of the present disclosure.

For example, FIG. 15 depicts a block diagram of an example sensor 102 according to example aspects of the present disclosure. As shown, the sensor 102 can include a light-emitting unit 160, a photo-detecting unit 180 (e.g., a 3D photo-detecting unit), and a controller 203.

The light-emitting unit 160 may include one or more light sources. For example, the light-emitting unit 160 can include a first light source 112 and a second light source 114. In some implementations, the first light source 112 and the second light source 114 can be implemented on separate chips, while in other implementations, the light source 112 and the light source 114 can be implemented on a single chip. In some implementations, a single light source 112 can be included in a light-emitting unit 160. The light source(s) 112/114 can be, for example, lasers (e.g., VCSEL) or light emitting diodes (LED), as disclosed herein.

In some implementations, the controller 203 (e.g., analog or digital circuitry, or one or more processors) can be configured to generate a first control signal CS1 and a second control signal CS2 to control (e.g., drive) the light emitted from the light sources 112/114. In some implementations, the first light source 112 can be configured to emit a first transmitting light at a first wavelength, and the second light source 114 can be configured to emit a second transmitting light at a second wavelength. In some implementations, a single light source 112 can be configured to emit the first transmitting light at the first wavelength and the second transmitting light at the second wavelength.

In some implementations, the photo-detecting unit 180 can include a first photodetector 108 and a second photodetector 110. In some implementations, the first photodetector 108 and the second photodetector 110 can be implemented on separate chips, while in other implementations, the photodetectors 108/110 can be implemented on a single chip. The photodetectors 108/110 can be configured to provide detecting signals DS1 and DS2 to the controller 203. For example, the detecting signals DS1 and DS2 can be generated by the photodetectors 108/110 when the incident light IL1 and IL2 (e.g., reflected transmitting light TL1 and TL2 reflecting off object 140) is absorbed by the photodetectors 108/110. In some implementations, a single photodetector 108 can be configured to absorb both the first incident light IL1 and the second incident light IL2, as disclosed herein. In some implementations, the photodetectors 108/110 can include, for example, silicon, germanium, and/or III-V group materials.

The controller 203 can be configured to output the sensor output SO. For example, in some implementations, the sensor output SO can include a respective magnitude EN1 and EN2 of the absorbed incident lights IL1 and IL2, as disclosed herein.

Figure 16:
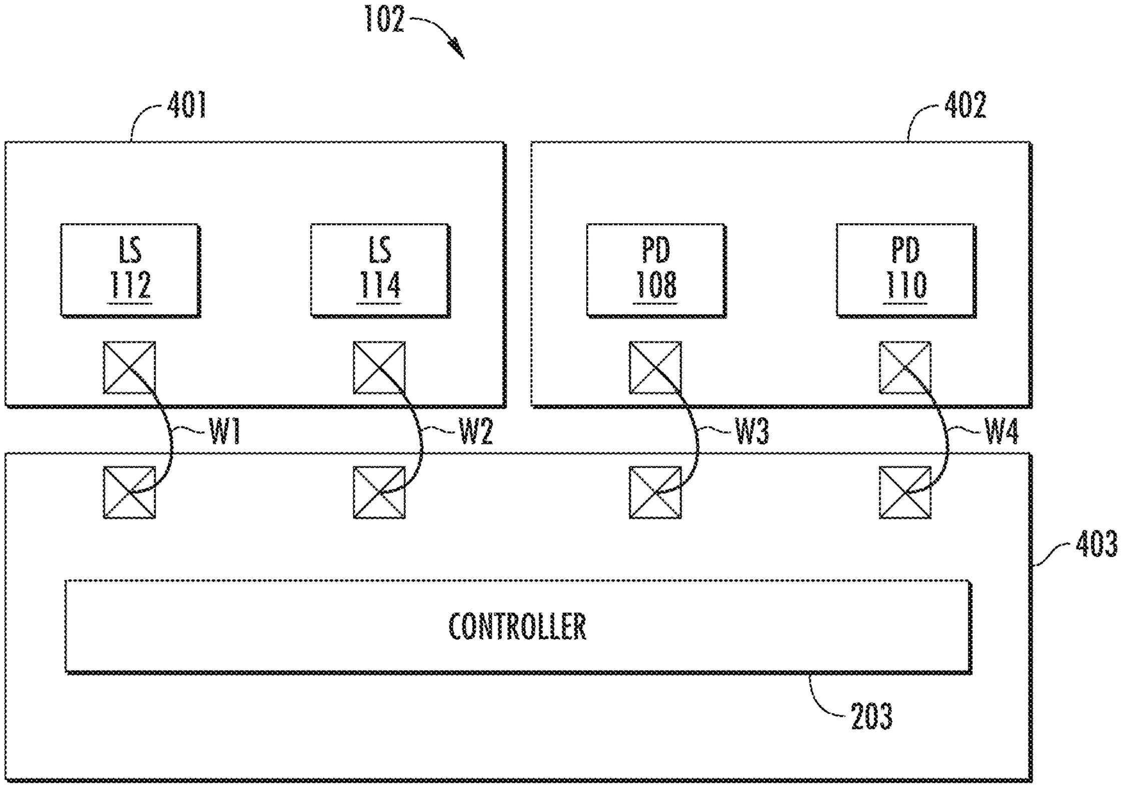
FIG. 16 depicts a block diagram of an example sensor according to example aspects of the present disclosure.

Referring now to FIG. 16, a block diagram of an example sensor 102 according to example aspects of the present disclosure is depicted. The sensor 102 can be used, for example, as a sensor 102 depicted in any of the Figs. herein.

As shown, the sensor 102 an include a first chip 401 implementing the light-emitting unit (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, light source 112 is coupled to the controller 203 via bonding wire W1, light source 114 is coupled to controller 203 via bonding wire W2, photodetector 108 is coupled to the controller 203 via bonding wire W3, and photodetector 110 is coupled to controller 203 via bonding wire W4. In some implementations, each light source 112/114 and each photodetector 108/110 can be individually implemented on separate chips. Further, as shown, in some implementations, each of the chips 401, 402, and 403 can be implemented in a common plane.

Figure 17:
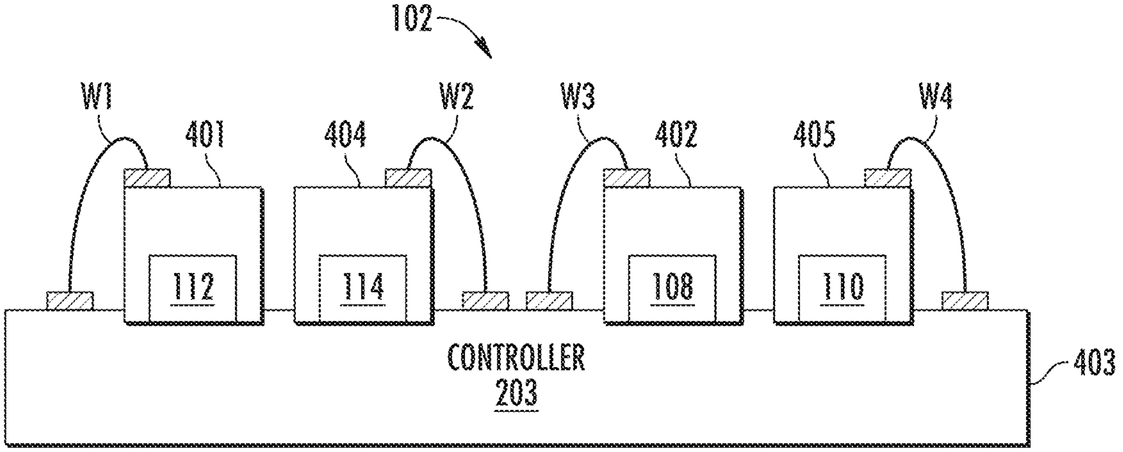
FIG. 17 depicts a block diagram of an example sensor according to example aspects of the present disclosure.

Referring now to FIG. 17, a block diagram of an example sensor 102 according to example aspects of the present disclosure is depicted. The sensor 102 can be used, for example, as a sensor 102 depicted in any of the Figs. herein. As shown, the first light source 112 is implemented in first chip 401, first photodetector 108 is implemented in second chip 402, controller 203 is implemented in third chip 403, second light source 114 is implemented in fourth chip 404, and second photodetector 110 is implemented in fifth chip 405. Thus, as shown, sensor 102 is implemented in a five-chip architecture, with each light source 112/114 and each photodetector 108/110 individually implemented on separate chips. In some implementations, light sources 112/114 can be combined in a single chip 401 (e.g., as shown in FIG. 16), and photodetectors 108/110 can be combined in a single chip 402 (e.g., as shown in FIG. 16). Further, as shown, light sources 112/114 and photodetectors 108/110 are wire-bonded to controller 203 via bonding wires W1, W2, W3, and W4, respectively. FIG. 17 further depicts a stacking architecture implementation of a sensor 102 in which the chips 401, 402, 404, and 405 are stacked on chip 403. The chips 401, 402, 404, and/or 405 can be coupled to the chip 403 using any suitable method, such as epoxy, mechanical fixation, etc. The stacking architecture depicted in FIG. 17 can allow for a package with reduced space requirements (e.g., reduced overhead/overall area) as compared to arranging each of the chips 401, 402, 403 (and/or 404, 405) in a common plane, as depicted in FIG. 16.

Figure 18:
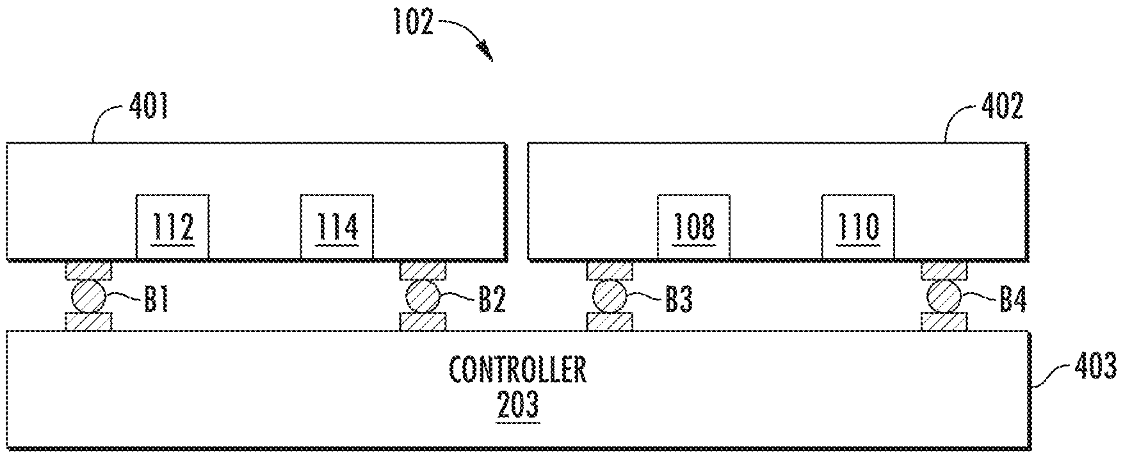
FIG. 18 depicts a block diagram of an example sensor according to example aspects of the present disclosure.

Referring now to FIG. 18, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the light-emitting unit 160 (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, first chip 401 and second chip 402 are coupled to third chip 403 using a flip-chip bonding implementation. For example, as shown, solder bumps B1 and B2 allow for light sources 112/114, respectively to be coupled to controller 203, and solder bumps B3 and B4 allow for photodetectors 108/110 to be coupled to controller 203. In some implementations, each light source 112/114 and each photodetector 108/110 can be individually implemented on separate chips (e.g., 401, 402, 404, 405), which can individually be flip-chip bonded to the chip 403 implementing the controller 203 via the solder bumps B1-B4. Implementing a sensor 102 using a flip-chip bonding implementation can also allow for a package with reduced space requirements (e.g., reduced overhead/overall area) as compared to arranging each of the chips 401, 402, 403 (and/or 404, 405) in a common plane, as depicted in FIG. 16. Further, since flip-chip bonding allows for the elimination of the wire bonds W1-W4 as depicted in FIG. 17, the package space requirements for a flip-chip bond implementation can be further reduced as compared to a wire-bonded and stacked architecture.

Figure 19:
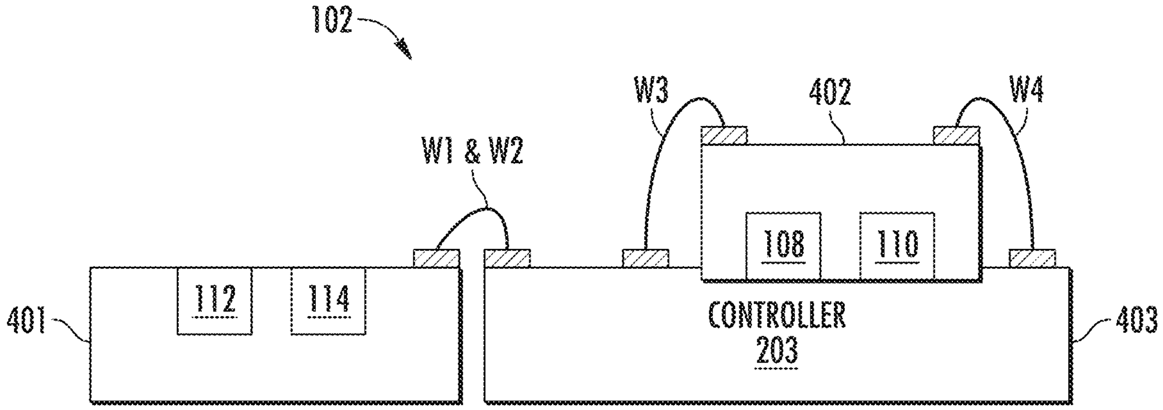
FIG. 19 depicts a block diagram of an example sensor according to example aspects of the present disclosure.

Referring now to FIG. 19, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the light-emitting unit 160 (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, the first chip 401 is wire bonded to the third chip 403 using bonding wires W1 and/or W2, and the second chip 402 is stacked on the third chip 403 and bonded using bonding wires W3 and/or W4. In some implementations, each light source 112/114 and each photodetector 108/110 can be individually implemented on separate chips (e.g., 401, 402, 404, 405), which can individually be stacked and/or bonded to the third chip 403 implementing the controller 203. Using a stacking architecture as shown in FIG. 19 can allow for a package with reduced space requirements (e.g., reduced overhead/overall area) as compared to arranging each of the chips 401, 402, 403 (and/or 404, 405) in a common plane, as depicted in FIG. 16.

Figure 20:
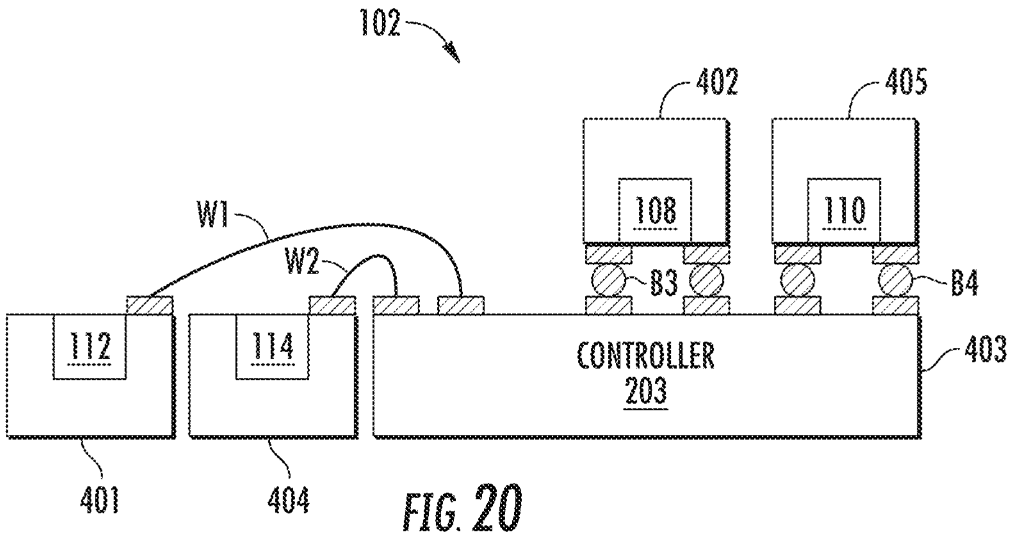
FIG. 20 depicts a block diagram of an example sensor according to example aspects of the present disclosure.

Referring now to FIG. 20, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the first light source 112, a second chip 402 implementing the first photodetector 108, a third chip 403 implementing the controller 203, a fourth chip 404 implementing second light source 114, and a fifth chip 405 implementing second photodetector 110. Thus, as shown, sensor 102 is implemented in a five-chip architecture, with each light source 112/114 and each photodetector 108/110 individually implemented on separate chips. In some implementations, light sources 112/114 can be combined in a single chip 401 (e.g., as shown in FIG. 16), and photodetectors 108/110 can be combined in a single chip 402 (e.g., as shown in FIG. 16). For example, as shown, the first chip 401 implementing first light source 112 is wire bonded to the third chip 403 via bonding wire W1, the fourth chip 404 implementing second light source 114 is wire bonded to the third chip 403 via bonding wire W2, the second chip 402 implementing photodetector 108 is flip-chip bonded to the third chip 403 via solder ball B3, and the fifth chip 405 implementing photodetector 110 is flip-chip bonded to the third chip 403 via solder ball B4. Using a stacking architecture as shown in FIG. 20 can allow for a package with reduced space requirements (e.g., reduced overhead/overall area) as compared to arranging each of the chips 401, 402, 403 (and/or 404, 405) in a common plane, as depicted in FIG. 16.

Figure 21:
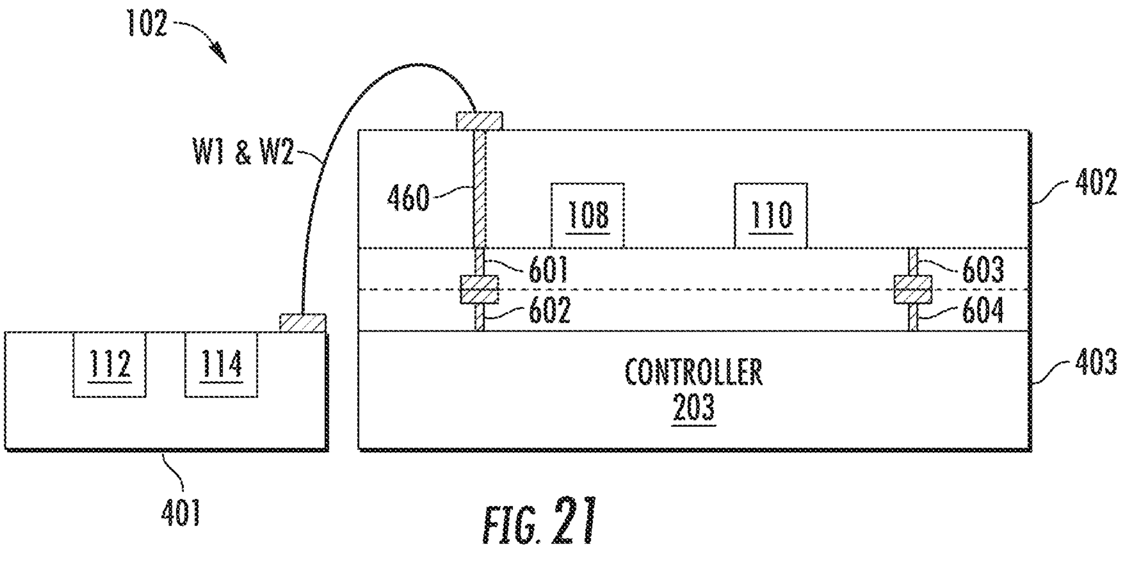
FIG. 21 depicts a block diagram of an example sensor according to example aspects of the present disclosure.

Referring now to FIG. 21, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the light-emitting unit 160 (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, the first chip 401 is wire bonded to the third chip 403 using bonding wires W1 and/or W2, and the second chip 402 is wafer-bonded to the third chip 403 using vias 601, 602, 603, and/or 604. For example, the vias 601-604 can be the interconnections between second chip 402 and third chip 403. Further, via 460 can allow for bonding wires W1 and/or W2 to connect first chip 401 to third chip 403. In some implementations, each light source 112/114 and each photodetector 108/110 can be individually implemented on separate chips (e.g., 401, 402, 404, 405), which can individually be stacked and/or bonded to the third chip 403 implementing the controller 203. In various implementations, different wafer-bonding techniques can be used, such as direct bonding, surface activated bonding, plasma activated bonding, anodic bonding, eutectic bonding, glass frit bonding, adhesive bonding, thermocompression bonding, reactive bonding, transient liquid phase diffusion bonding, and/or other wafer-bonding techniques. Using a wafer-bonding architecture as shown in FIG. 21 can allow for a package with reduced space requirements (e.g., reduced overhead/overall area) as compared to arranging each of the chips 401, 402, 403 (and/or 404, 405) in a common plane, as depicted in FIG. 16.

Figure 22:
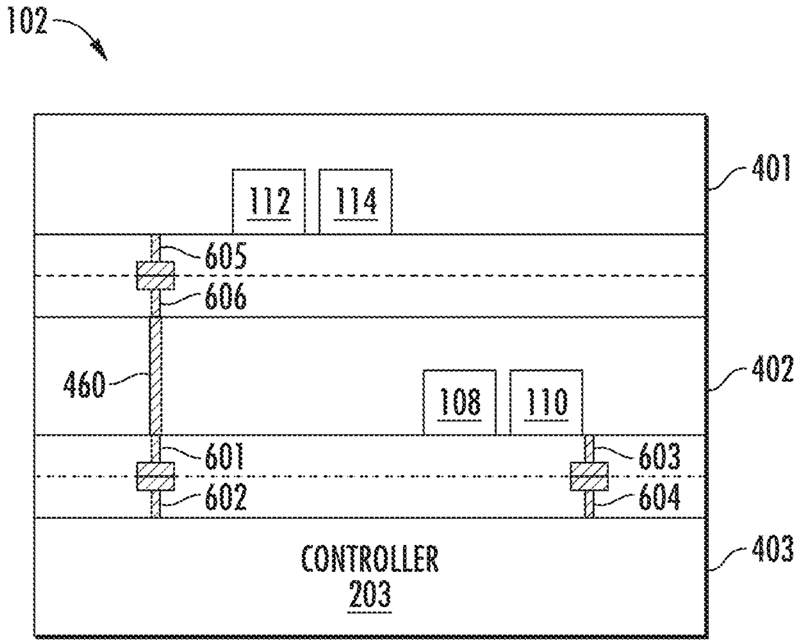
FIG. 22 depicts a block diagram of an example sensor according to example aspects of the present disclosure.

Referring now to FIG. 22, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the light-emitting unit 160 (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, the first chip 401 is wafer-bonded to the second chip 402 using vias 605 and/or 606. Via 460, via 601, and/or via 602 can allow for the first chip 401 to be coupled to the third chip 403 implementing the controller 203. Further, second chip 402 can be wafer-bonded to the third chip 403 using vias 603 and/or 604. In some implementations, each light source 112/114 and each photodetector 108/110 can be individually implemented on separate chips (e.g., 401, 402, 404, 405), which can individually stacked and/or wafer-bonded to the third chip 403 implementing the controller 203. Using a wafer-bonding architecture as shown in FIG. 22 can allow for a package with reduced space requirements (e.g., reduced overhead/overall area) as compared to arranging each of the chips 401, 402, 403 (and/or 404, 405) in a common plane, as depicted in FIG. 16.

Figure 23:
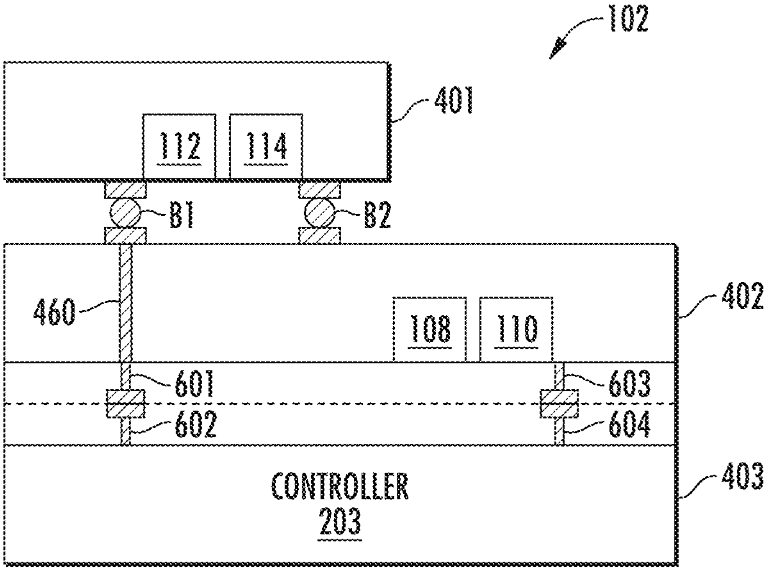
FIG. 23 depicts a block diagram of an example sensor according to example aspects of the present disclosure.

Referring now to FIG. 23, a block diagram of an example sensor 102 according to example aspects of the present disclosure is depicted. The sensor 102 can be used, for example, as a sensor 102 depicted in any of the Figs. herein. As shown, the sensor 102 can include a first chip 401 implementing the light-emitting unit 160 (e.g., the light sources 112/114), a second chip 402 implementing the photo-detecting unit (e.g., photodetectors 108/110), and a third chip 403 implementing the controller 203. As shown, each of the chips 401, 402, and 403 are discrete chips coupled together to implement the sensor 102. For example, as shown, the first chip 401 is flip-chip bonded to the second chip 402 using solder balls B1 and B2. Via 460, via 601, and/or via 602 can allow for the first chip 401 to be coupled to the third chip 403 implementing the controller 203. Further, second chip 402 can be wafer-bonded to the third chip 403 using vias 603 and/or 604. In some implementations, each light source 112/114 and each photodetector 108/110 can be individually implemented on separate chips (e.g., 401, 402, 404, 405), which can be individually stacked and/or wafer-bonded to the third chip 403 implementing the controller 203. Using a flip-chip and wafer-bonding architecture as shown in FIG. 23 can allow for a package with reduced space requirements (e.g., reduced overhead/overall area) as compared to arranging each of the chips 401, 402, 403 (and/or 404, 405) in a common plane, as depicted in FIG. 16.

Figure 24:
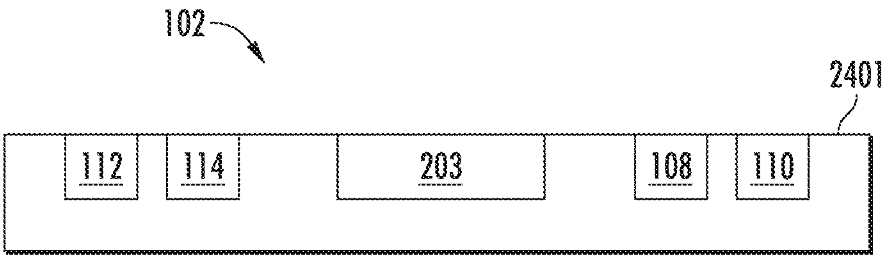
FIG. 24 depicts a block diagram of an example sensor according to example aspects of the present disclosure.

Referring now to FIG. 24, a block diagram of an example sensor 102 according to example aspects of the present disclosure is depicted. The sensor 102 can be used, for example, as a sensor 102 depicted in any of the Figs. herein. As shown, the sensor 102 can include a single chip 2401 (e.g., a common chip, a monolithic chip, etc.) implementing the light-emitting unit 160 (e.g., the light sources 112/114), the photo-detecting unit (e.g., photodetectors 108/110), and the controller 203. For example, during manufacturing, each of the light-emitting unit (e.g., the light sources 112/114), the photo-detecting unit (e.g., photodetectors 108/110), and the controller 203 can be manufactured on a single chip. Using a monolithic architecture as shown in FIG. 24 can allow for a package with reduced space requirements (e.g., reduced overhead/overall area) as compared to arranging each of a plurality of chips (e.g., 401, 402, 403, 404, and/or 405) in a common plane, as depicted in FIG. 16.

Figure 25:
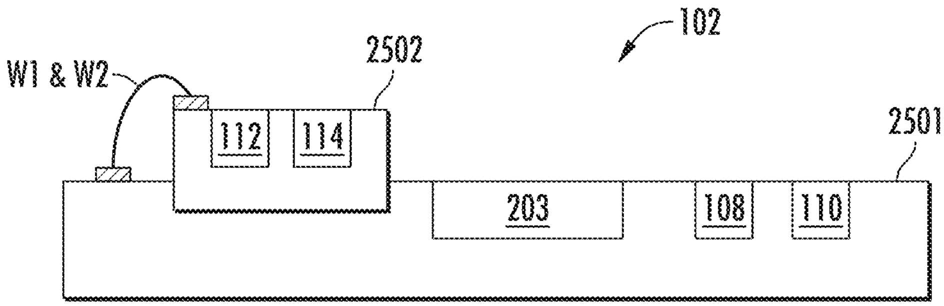
FIG. 25 depicts a block diagram of an example sensor according to example aspects of the present disclosure.

Referring now to FIG. 25, a block diagram of an example sensor 102 according to example aspects of the present disclosure is depicted. The sensor 102 can be used, for example, as a sensor 102 depicted in any of the Figs. herein. As shown, the sensor 102 can include a first chip 2501 implementing the photo-detecting unit (e.g., photodetectors 108/110) and the controller 203. For example, during manufacturing, the photo-detecting unit (e.g., photodetectors 108/110) and the controller 203 can be manufactured on the chip 2501. Further, a second chip 2502 can implement the light-emitting unit (e.g., the light sources 112/114). As shown, the second chip 2502 can be stacked on the first chip 2501, and the second chip 2502 can be coupled to the first chip 2501 using bonding wires W1 and/or W2. Using a combination of a stacked and monolithic architecture as shown in FIG. 25 can allow for a package with reduced space requirements (e.g., reduced overhead/overall area) as compared to arranging each of a plurality of chips (e.g., 401, 402, 403, 404, and/or 405) in a common plane, as depicted in FIG. 16. In some implementations, a similar architecture can be used in which the photodetectors 108/110 are implemented in second chip 2502, and the light sources 112/114 are implemented in first chip 2501.

Figure 26:
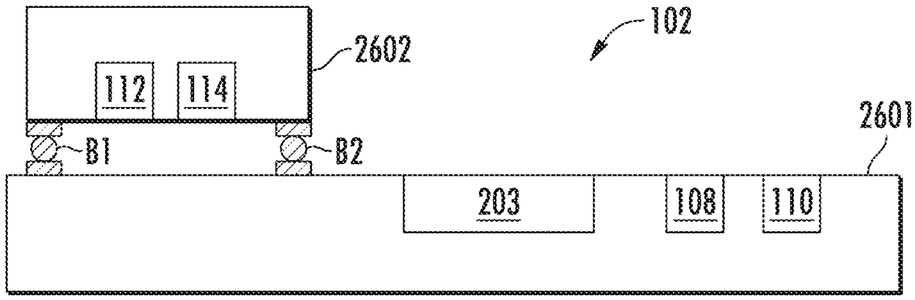
FIG. 26 depicts a block diagram of an example sensor according to example aspects of the present disclosure.

Referring now to FIG. 26, a block diagram of an example sensor 102 according to example aspects of the present disclosure is depicted. The sensor 102 can be used, for example, as a sensor 102 depicted in any of the Figs. herein. As shown, the sensor 102 can include a first chip 2601 implementing the photo-detecting unit (e.g., photodetectors 108/110) and the controller 203. For example, during manufacturing, the photo-detecting unit (e.g., photodetectors 108/110) and the controller 203 can be manufactured on the chip 2601. Further, a second chip 2602 can implement the light-emitting unit (e.g., the light sources 112/114). As shown, the second chip 2602 can be flip-chip bonded to the first chip 2601 using solder balls B1 and/or B2. Using a combination of a flip-chip and monolithic architecture as shown in FIG. 26 can allow for a package with reduced space requirements (e.g., reduced overhead/overall area) as compared to arranging each of a plurality of chips (e.g., 401, 402, 403, 404, and/or 405) in a common plane, as depicted in FIG. 16. In some implementations, a similar architecture can be used in which the photodetectors 108/110 are implemented in second chip 2602, and the light sources 112/114 are implemented in first chip 2601.

Figure 27:
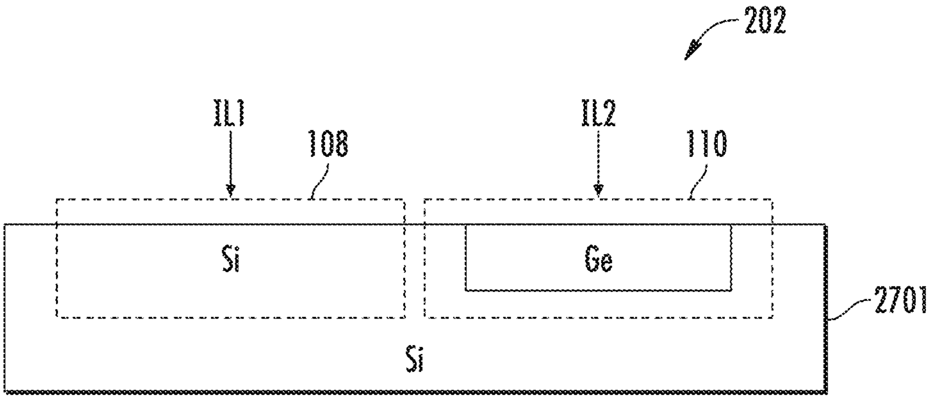
FIG. 27 depicts a block diagram of an example photo-detecting circuit according to example aspects of the present disclosure.

Referring now to FIG. 27, an example photo-detecting circuit 202 is depicted. As shown, the photo-detecting circuit 202 can include a first photodetector 108 and a second photodetector 110. In some implementations, a single photodetector 108/110 can be implemented in a photo-detecting circuit 202.

As shown, the first photodetector 108 can be implemented using silicon and the second photodetector 110 can be implemented using germanium to absorb the first incident light IL1 and the second incident light IL2, respectively. As described herein, the first incident light IL1 and the second incident light IL2 can be at different wavelengths. Further, as shown, the silicon and germanium photodetectors 108/110 can be integrated and formed on a common substrate 2701, such as silicon. In other implementations, both photodetectors 108/110 can be implemented using other materials, such as both photodetectors 108/110 using germanium or other III-V group materials. In some implementations, the silicon, germanium and/or III-V group materials implementing the photodetectors 108/110 can be partially recessed, fully recessed, and/or embedded in the silicon substrate 2701. The photodetector 202 depicted in FIG. 27 can allow for a reduction in the overall area as well as a reduction in the manufacturing cost of the photo-detecting circuit 202 as compared to manufacturing the photodetectors 108/110 individually.

Figure 28:
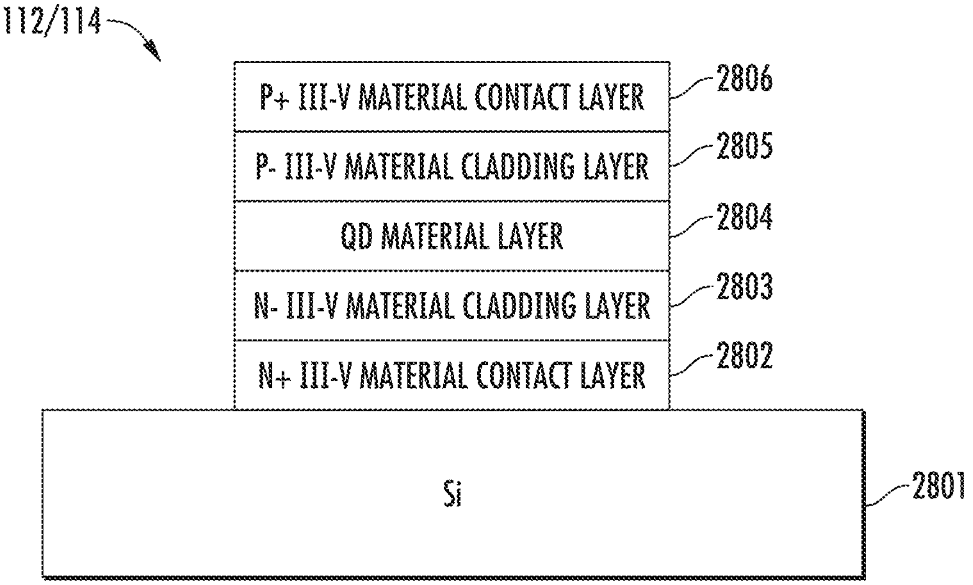
FIG. 28 depicts a block diagram of an example light source according to example aspects of the present disclosure.

Referring now to FIG. 28, a cross-sectional view of an example light source 112/114 is depicted. The light source 112/114 can be, for example, used as a light source 112/114 depicted in any of the Figs. As shown, the light source 112/114 can include a silicon substrate 2801, a N+ III-V material contact layer 2802 (e.g., N+ GaAs), a N-III-V material cladding layer 2803 (e.g., N− AlGaAs), a quantum dot (QD) material layer 2804 (e.g., InGaAs), a P− III-V material cladding layer 2805 (e.g., P− AlGaAs), and a P+ III-V material contact layer 2806 (e.g., P+ AlGaAs).

Figure 29A:
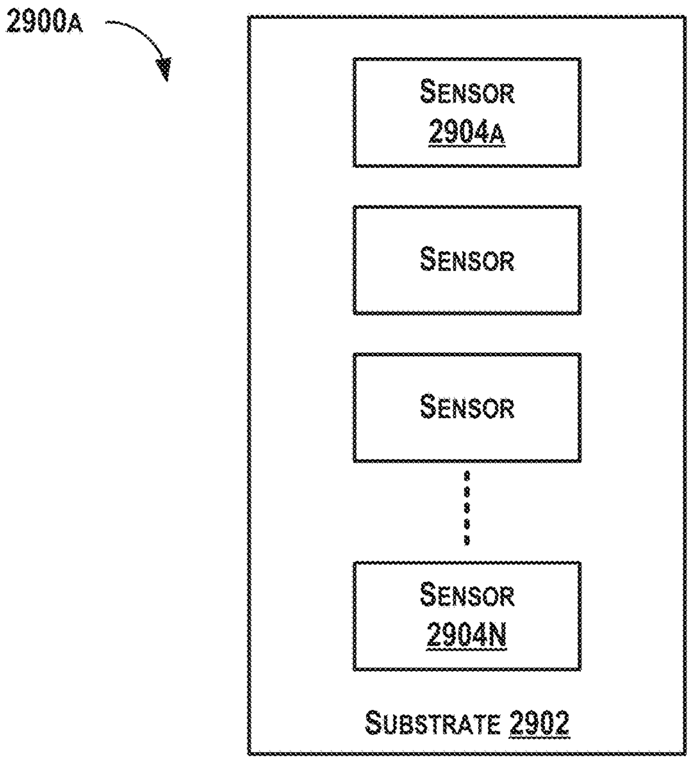
FIG. 29A depicts a block diagram of an example photo-detector array according to example aspects of the present disclosure.

Referring now to FIG. 29A, a one-dimensional photodetector array 2900*a* is depicted. The one-dimensional photodetector array 2900*a* includes a substrate 2902 (e.g., silicon substrate) and N photodetectors 2904 (e.g., germanium photodetectors) arranged in a one-dimensional array, where Nis any positive integer. The one-dimensional photodetector array 2900*a* can be used to implement, for example, the first photodetector 108 or the second photodetector 110 as described in reference to FIG. 2. In some other implementations, the one-dimensional photodetector array 2900*a* can be partitioned to include both the first photodetector 108 and the second photodetector 110.

Figure 29B:
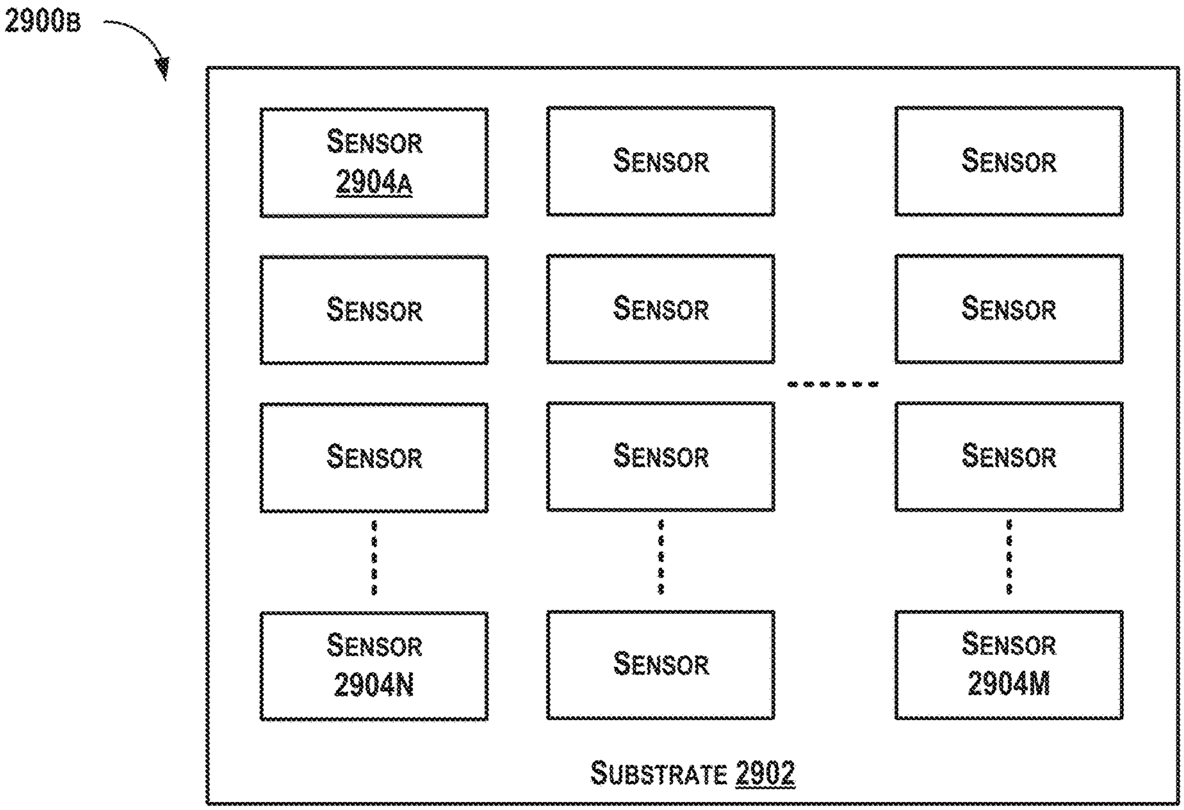
FIG. 29B depicts a block diagram of an example photo-detector array according to example aspects of the present disclosure.

Referring now to FIG. 29B, a two-dimensional photodetector array 2900*b* is depicted. The two-dimensional photodetector array 2900*b* includes a substrate 2902 (e.g., silicon substrate) and M×N photodetectors 2904 (e.g., germanium photodetectors) arranged in a two-dimensional array, where M and N are any positive integers. The two-dimensional photodetector array 2900*b* can be used to implement, for example, the first photodetector 108 or the second photodetector 110 as described in reference to FIG. 2. In some other implementations, the two-dimensional photodetector array 2900*b* can be partitioned to include both the first photodetector 108 and the second photodetector 110.

Figure 30:
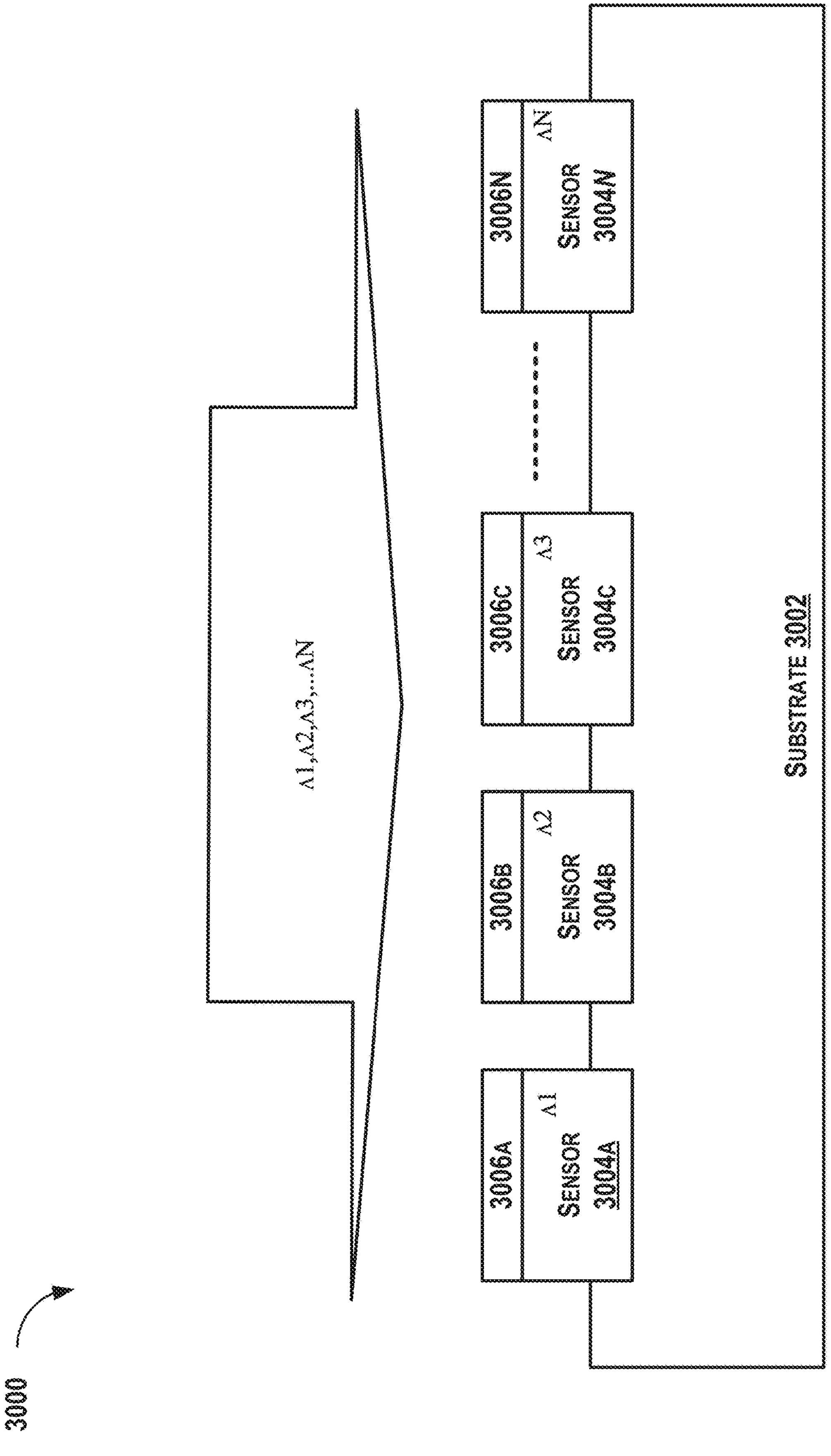
FIG. 30 depicts an example photo-detector array according to example aspects of the present disclosure.

Referring now to FIG. 30, a front-side-incident (FSI) photodetector array 3000 is depicted. The FSI photodetector array 3000 may be 1D array (as depicted in FIG. 29A) or 2D array (as depicted in FIG. 29B). The FSI photodetector array 3000 includes a substrate 3002 (e.g., silicon substrate) and N photodetectors 3004 (e.g., germanium photodetectors). The FSI photodetector array 3000 further includes N optical filters 3006 that each corresponds to one of the N photodetectors 3004. In some implementations, each of the N optical filters 3006 is a bandpass filter that is configured to pass an incident light having a wavelength (e.g., λ1) within a corresponding wavelength range, and blocks light having a wavelength (e.g., λ2) outside the corresponding wavelength range. The optical filters 3006 may be implemented using an absorption material, or multi-layer coating, or in-plane periodic/aperiodic grating. As an example, the bandpass filters 3006*a*, 3006*b*, 3006*c*, . . . , and 3006N may be configured to pass light having a wavelength of λ1, λ2, λ3, . . . , and λN, respectively. A broadband light that includes wavelengths λ1 to λN is incident to the FSI photodetector array 3000, and the bandpass filters 3006*a*, 3006*b*, 3006*c*, . . . , and 3006N may then filter the broadband light such that each of the sensors 3004*a*, 3004*b*, 3004*c*, and 3004N receives light having a wavelength of λ1, λ2, λ3, and λN, respectively. The detected signals at different wavelengths can be used for optical spectroscopy applications, for example.

Figure 31:
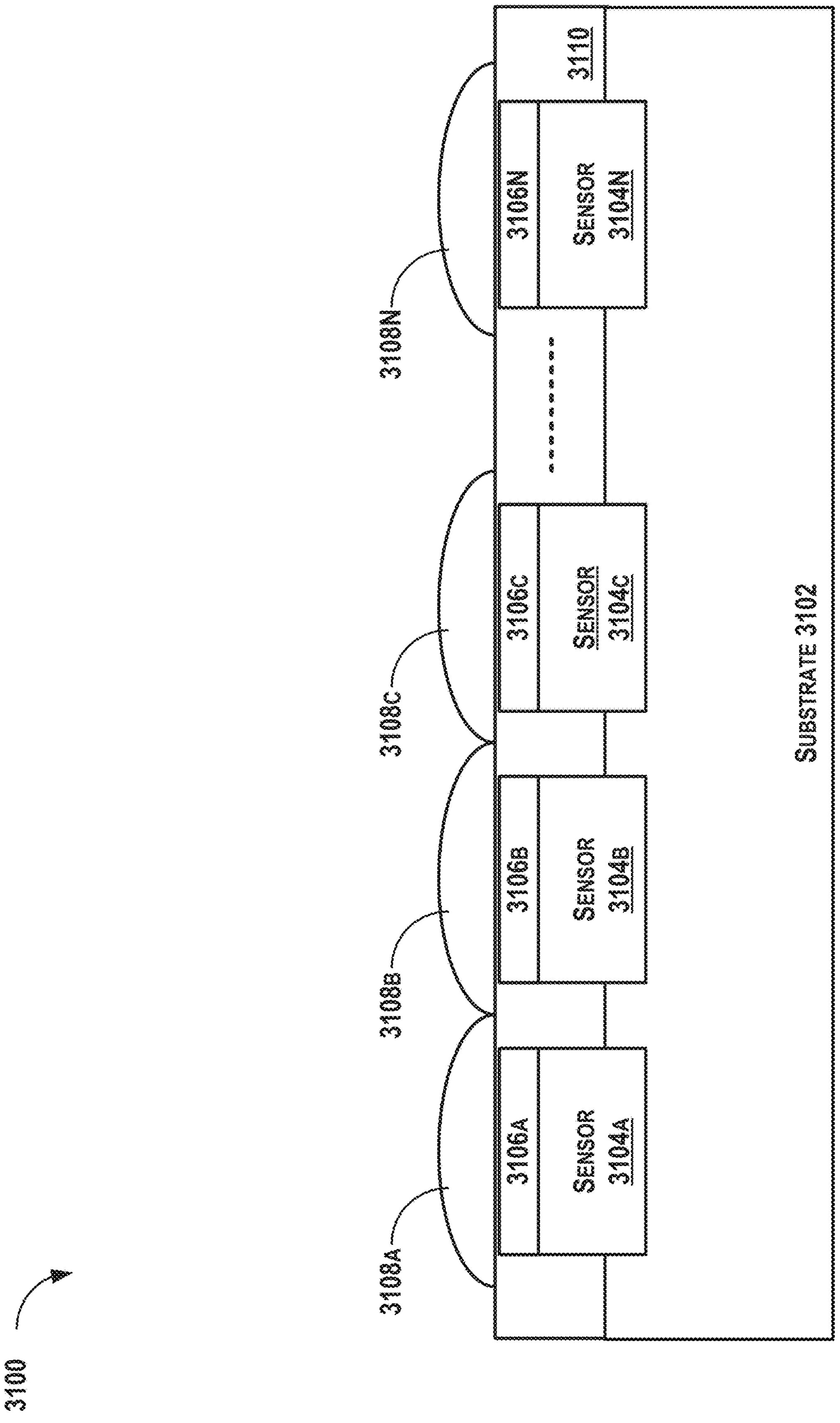
FIG. 31 depicts an example photo-detector array according to example aspects of the present disclosure.

Referring now to FIG. 31, a FSI photodetector array 3100 is depicted. The FSI photodetector array 3100 is similar to the FSI photodetector array 3000 and further includes micro-lens array 3108 for directing (e.g., focusing) the incident light to the photodetectors 3104. The micro-lens array 3108 may be formed using silicon, oxide, polymer, or any other suitable materials. The FSI photodetector array 3000 may include a spacer 3110 to form a planar surface prior to forming the micro-lens array 3108 over the filter 3106.

Figure 32:
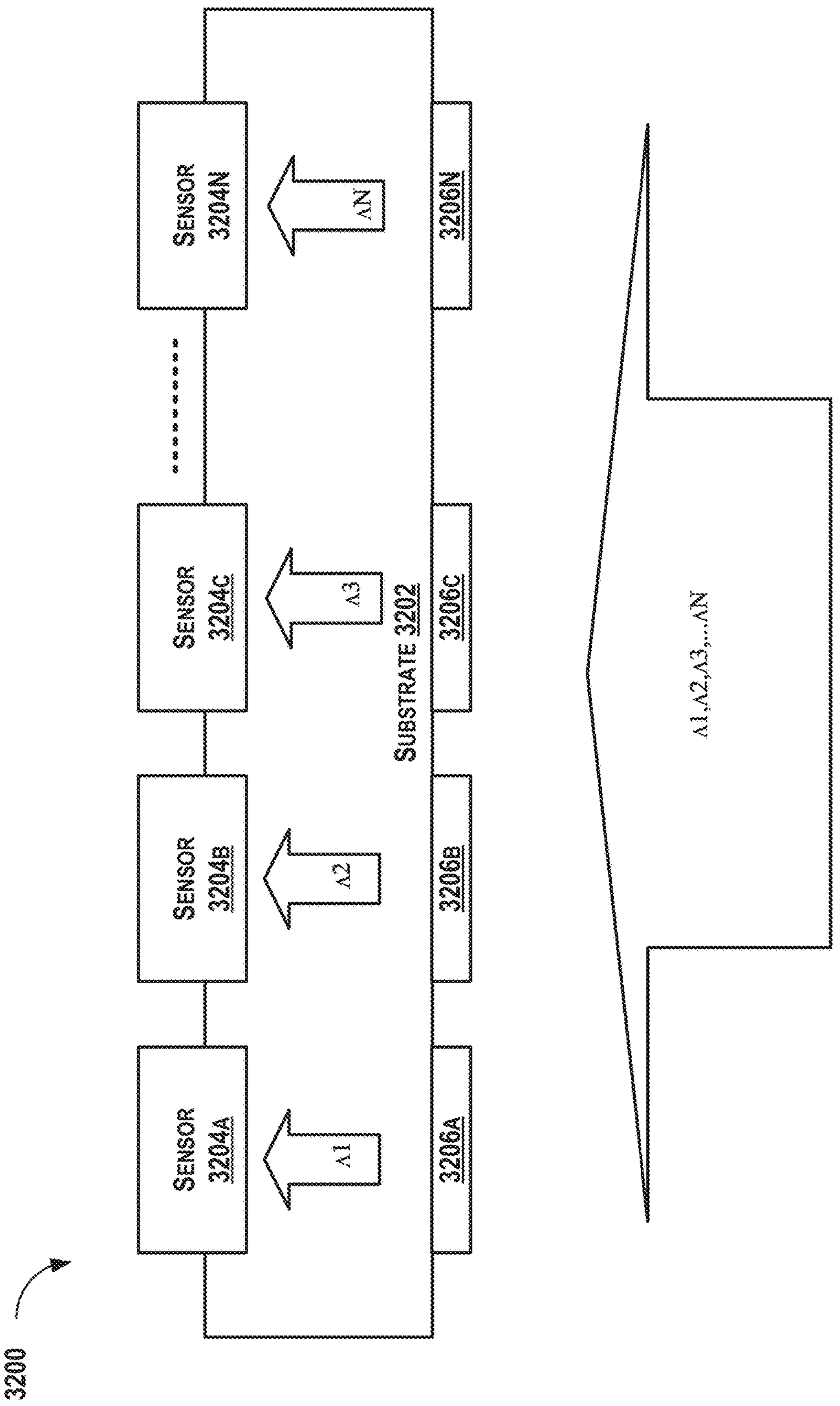
FIG. 32 depicts an example photo-detector array according to example aspects of the present disclosure.

Referring now to FIG. 32, a back-side-incident (BSI) photodetector array 3200 is depicted. The BSI photodetector array 3200 may be 1D array (as depicted in FIG. 29A) or 2D array (as depicted in FIG. 29B). The BSI photodetector array 3200 includes a substrate 3202 (e.g., silicon substrate) and N photodetectors 3204 (e.g., germanium photodetectors). The BSI photodetector array 3200 further includes N optical filters 3206 formed on the back of the substrate 3202 that each corresponds to one of the N photodetectors 3204. In some implementations, each of the N optical filters 3206 is a bandpass filter that is configured to pass an incident light having a wavelength (e.g., λ1) within a corresponding wavelength range, and blocks light having a wavelength (e.g., λ2) outside the corresponding wavelength range. The optical filters 3206 may be implemented using an absorption material, or multi-layer coating, or in-plane periodic/aperiodic grating. As an example, the bandpass filters 3206*a*, 3206*b*, 3206*c*, . . . , and 3206N may be configured to pass light having a wavelength of λ1, λ2, λ3, . . . , and λN, respectively. A broadband light that includes wavelengths λ1 to ΔN is incident to the BSI photodetector array 3200, and the bandpass filters 3206*a*, 3206*b*, 3206*c*, . . . , and 3206N may then filter the broadband light such that each of the sensors 3204*a*, 3204*b*, 3204*c*, and 3204N receives light having a wavelength of λ1, λ2, λ3, and λN, respectively. The detected signals at different wavelengths can be used for optical spectroscopy applications, for example.

Figure 33:
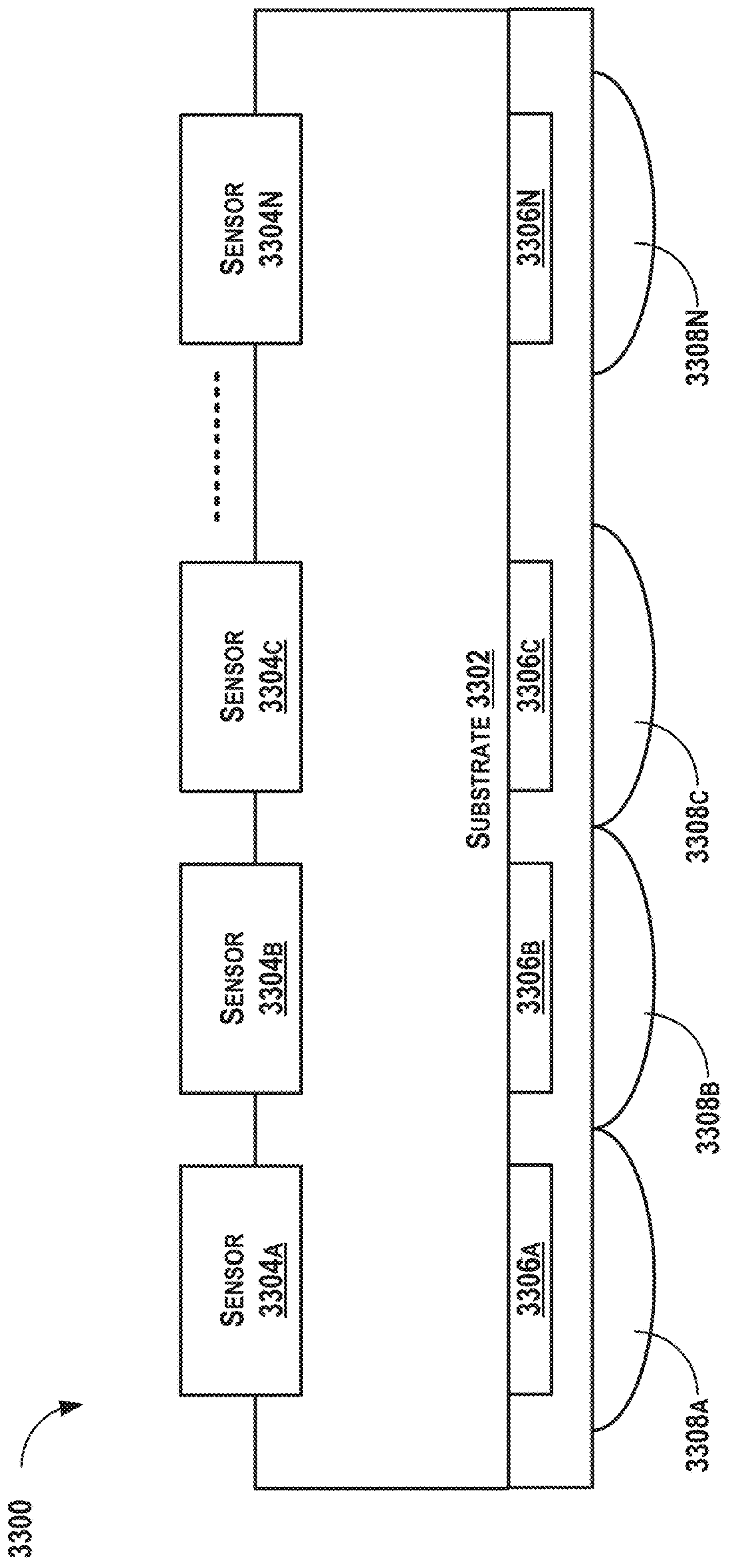
FIG. 33 depicts an example photo-detector array according to example aspects of the present disclosure.

Referring now to FIG. 33, a BSI photodetector array 3300 is depicted. The BSI photodetector array 3300 is similar to the BSI photodetector array 3200 and further includes micro-lens array 3208 for directing (e.g., focusing) the incident light to the photodetectors 3204. The micro-lens array 3208 may be formed using silicon, oxide, polymer, or any other suitable materials. The BSI photodetector array 3200 may include a spacer 3210 to form a planar surface prior to forming the micro-lens array 3208 over the filter 3206.

Figure 10:
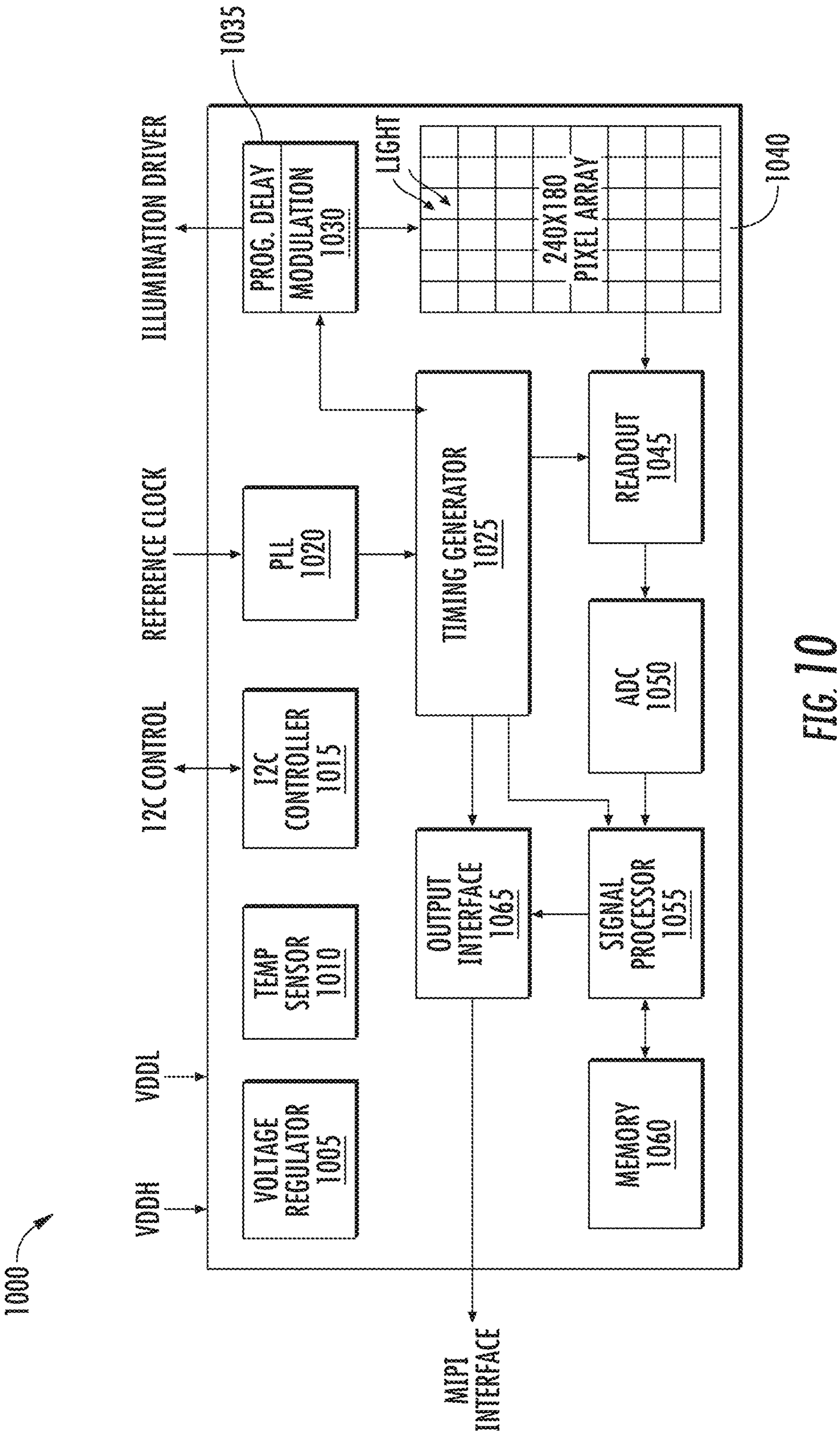
FIG. 10 depicts a block diagram of an example wideband sensor according to example aspects of the present disclosure.

Referring now to FIG. 10, a block diagram of an example wideband sensor 1000 is depicted. The wideband sensor 1000 can be, for example, an iToF sensor. As shown, the wideband sensor 1000 can include a voltage regulator 1005, a temperature sensor 1010, an I2C controller 1015, a PLL 1020, a Timing Generator 1025, Modulation 1030, a Programmable Delay 1035, a Pixel Array 1040, a Readout 1045, an ADC 1050, a Signal Processor 1055, a Memory 1060, and an Output Interface 1065.

The Voltage Regulator 1005 can regulate a voltage for the wideband sensor 1000. For example, in some implementations, two voltage domains can be used by the wideband sensor 1000, such as a VDDH (e.g., >2.7V) and a VDDL (e.g., approximately 1.8V). The temperature sensor 1010 can be used to calibrate depth and power control for the wideband sensor 1000. The I2C (Inter-Integrated Circuit) Controller 1015 can allow for communication of signals between components of the wideband sensor 1000. The I2C control signal can allow for clock synchronization, etc. The PLL (Phase Locked Loop) 1020 can receive a reference clock signal and can generate one or more outputs signal related to the phase of the reference clock. For example, in some implementations, the PLL can generate four-phase system clocks for Modulation 1030 and demodulation. In some implementations, the modulation frequency can be between 10 and 500 MHz. The Timing Generator 1025 can gate and condition the clock signals from the PLL for preset integration times and for different operation modes. In some implementations, a Programmable Delay 1035 can be added to the illumination driver path. Reflected light (e.g., IL1, IL2, etc.) can then be received by the Pixel Array 1040. In some implementations, the Pixel Array can be a 240×180 pixel array. In other implementations, other suitable pixel resolutions can similarly be used. The Readout 1045 can bridge the Pixel Array 1040 and the Analog to Digital Converter (ADC) 1050. In some implementations, the Readout 1045 can include a plurality of sample- and hold circuits and buffers. In some implementations, each pixel in the Pixel Array 1040 can be read out twice to reduce noise. In some implementations, the ADC 1050 can be designed with a SAR architecture. The output(s) from the ADC can be further processed by the Signal Processor 1055 and Memory 1060 before being provided to the Output Interface 1065. The Output Interface 1065 can then provide the Sensor Output (SO), such as via a MIPI interface.

Figure 11:
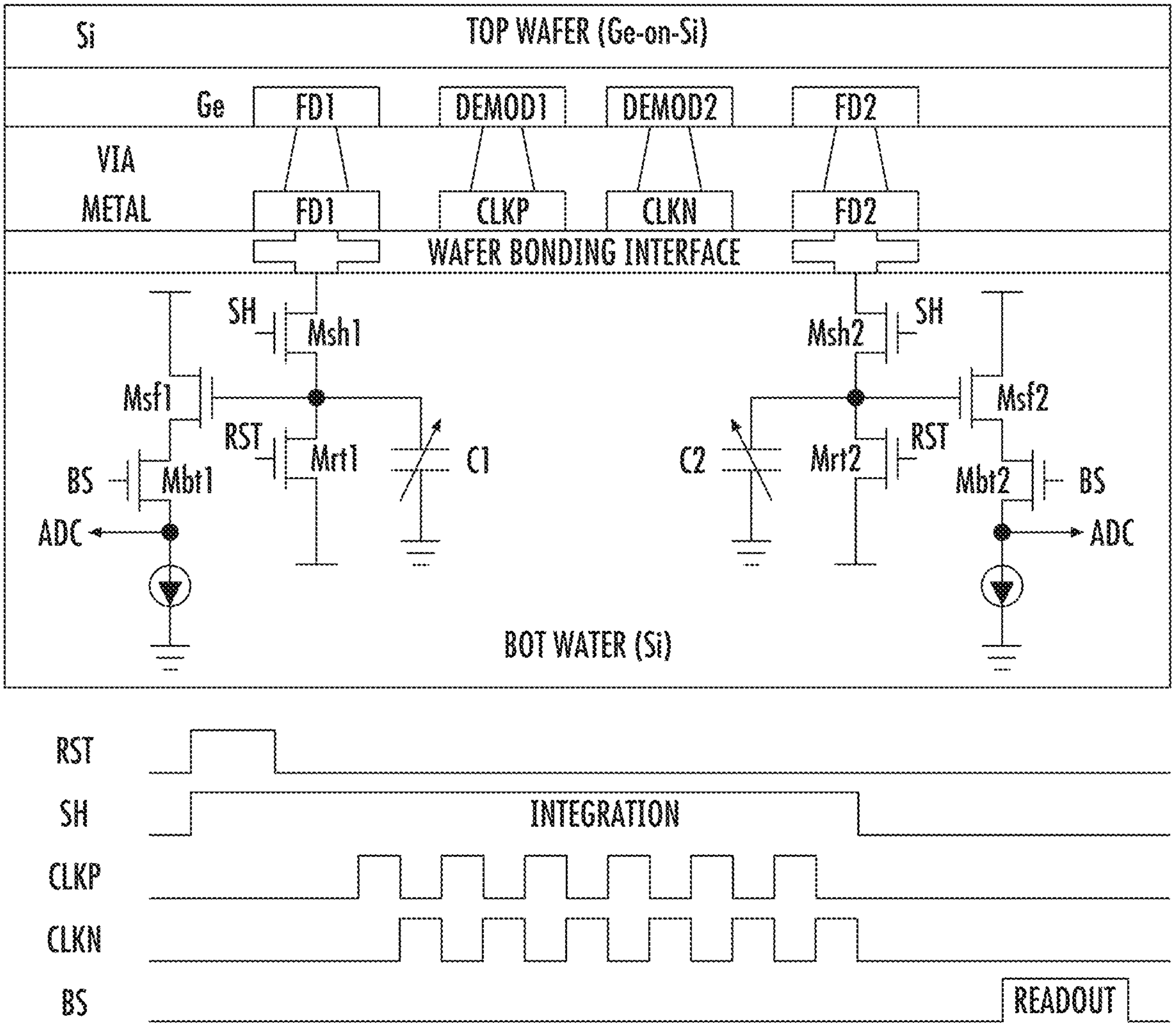
FIG. 11 depicts a cross-section view of an example portion of an example photodetector according to example aspects of the present disclosure.

In some implementations, the Pixel Array 1040 can be implemented in a Germanium-on-Silicon (Ge-on-Si) platform to allow for improved absorption efficiency and higher modulation speed. An example pixel region cross-section and example clock signals suitable for use in a Pixel Array 1040 in a Ge-on-Si platform are depicted in FIG. 11. The example pixel array depicted in FIG. 11 implements a Ge-on-Si architecture, which can allow for absorption of wavelengths in the NIR and SWIR range. This can allow for better signal to noise ratios (SNR) to be achieved while staying within maximum permissible exposure limits (MPE) such as, for example, by enabling increased power light sources to be used.

Figure 12:
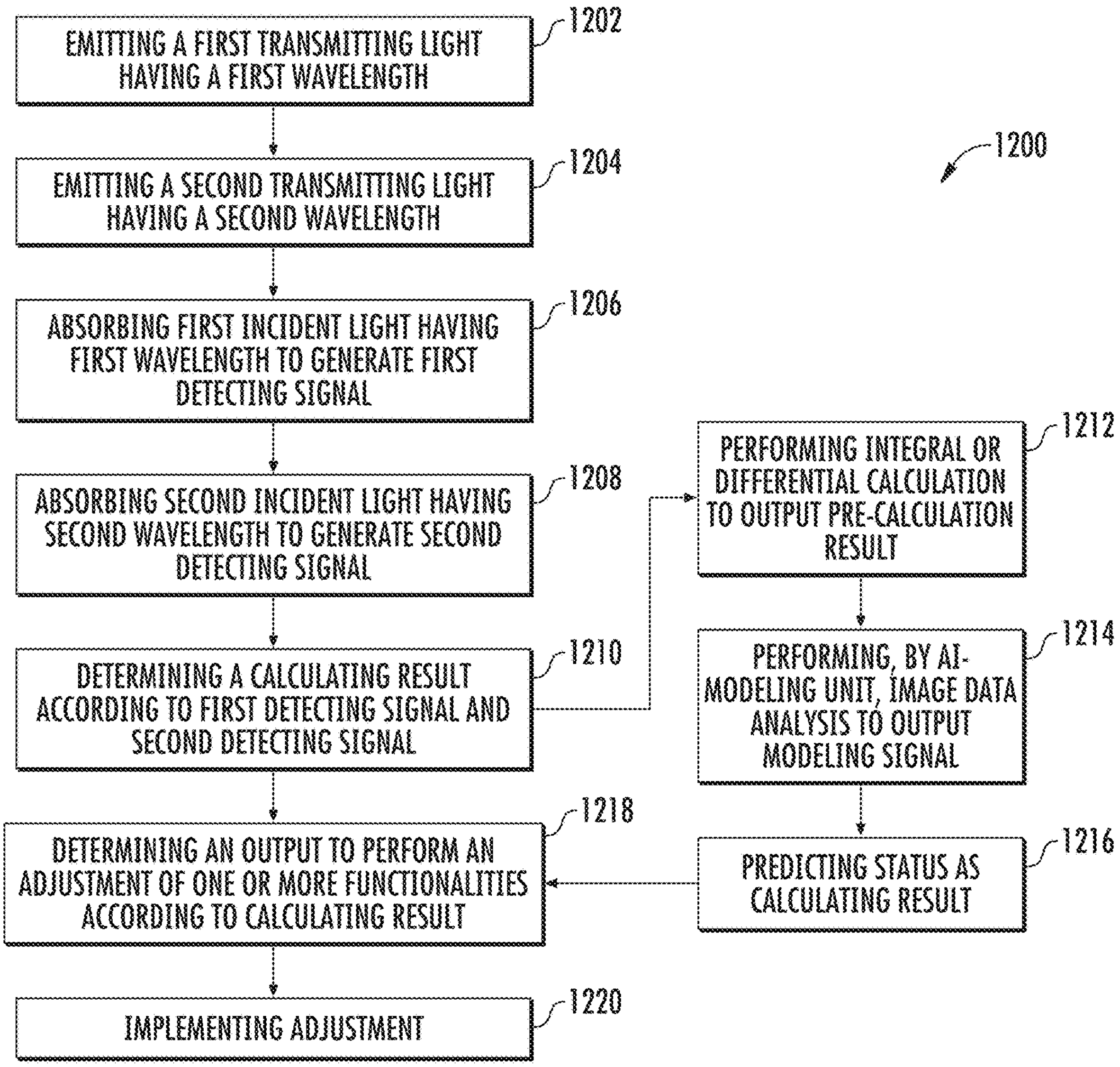
FIG. 12 depicts a flow diagram of an example method according to example aspects of the present disclosure.

Referring now to FIG. 12, an example method 1200 according to example aspects of the present disclosure is depicted. One or more portion(s) of the method 1200 can be implemented by a computing system that includes one or more computing devices and/or components thereof, such as, for example, the computing systems described with reference to the other figures (e.g., sensing apparatuses 100-900, wideband sensors and portions thereof 1000, 1100), computing systems 1300, 1400, etc.) Each respective portion of the method 1200 can be performed by any (or any combination) of one or more computing devices, sensing apparatuses, and/or wideband sensors or portions thereof. Moreover, one or more portion(s) of the method 1200 can be implemented as an algorithm on the hardware components of the device(s) described herein. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 12 is described with reference to elements/terms described with respect to other systems and figures for exemplary illustrated purposes and is not meant to be limiting. One or more portions of method 1200 can be performed additionally, or alternatively, by other systems.

At 1202, the method 1200 can include emitting a first transmitting light having a first wavelength. For example, in some implementations, a light source (e.g., VCSEL laser, LED, etc.) can be configured to transmit a first transmitting light TL1. In some implementations, the first wavelength can be, for example, smaller than a threshold wavelength (e.g., <1050 nm).

At 1204, the method 1200 can include emitting a second transmitting light having a second wavelength. For example, in some implementations, a light source (e.g., VCSEL laser, LED, etc.) can be configured to transmit a second transmitting light TL2. In some implementations, the second wavelength can be, for example, greater than a threshold wavelength (e.g., >1050 nm). In some implementations, the light source can be the same light source that transmitted the first transmitting light TL1, while in other implementations, the light source can be a separate light source. In some implementations, the first wavelength and the second wavelength can be different wavelengths (e.g., 850 nm, 905 nm, 940 nm, 1050 nm, 1064 nm, 1310 nm, 1350 nm, 1400 nm, 1550 nm, etc.).

At 1206, the method 1200 can include absorbing a first incident light having a first wavelength to generate a first detecting signal. For example, in some implementations, a photo-detecting unit can absorb a reflected incident light IL1 which reflected off of an object when the first transmitting light TL1 hit the object. In some implementations, the photo-detecting unit can be a 2D or 3D photo-detecting unit. In some implementations, the incident light IL1 can be a reflected light which was emitted by a separate light source (e.g., sunlight, ambient light, etc.)

At 1208, the method 1200 can include absorbing a second incident light having a second wavelength to generate a second detecting signal. For example, in some implementations, a photo-detecting unit can absorb a reflected incident light IL2 which reflected off of an object when the second transmitting light TL2 hit the object. In some implementations, the photo-detecting unit can be a 2-D or 3-D photo-detecting unit. In some implementations, the second incident light having the second wavelength can be absorbed by the same photo-detecting unit as the first incident light, while in other implementations, a separate photo-detecting unit can detect the second incident light. In some implementations, the incident light IL2 can be a reflected light which was emitted by a separate light source (e.g., sunlight, ambient light, etc.)

At 1210, the method 1200 can include determining a calculating result according to the first detecting signal and the second detecting signal. For example, in some implementations, a calculation circuit can be configured to calculate a ratio of a first magnitude of the first detecting signal and the second magnitude of the second detecting signal.

In some implementations, determining the calculating result according to the first detecting signal and the second detecting signal can include performing integral or differential calculation to output a pre-calculation result. For example, in some implementations, a pre-calculation unit can be configured to obtain integral or differential information in different wavelengths so that one or more machine-learned models (e.g., AI modeling units) can perform image analysis. In some implementations, the integral or differential information can be transformed to a frequency domain (e.g., a wavelet transform). In some implementations, the pre-calculation result can be used as a training data seed as described in greater detail herein.

At 1214, the method 1200 can include performing, by an AI-modeling unit, an image data analysis to output a modeling signal. For example, in some implementations, a sensor output signal SO can be provided to one or more machine-learned models (e.g., a second AI modeling unit) which performs image data analysis to output a modeling signal.

At 1216, the method 1200 can include predicting a status of an object as the calculating result. For example, in some implementations, a prediction unit can predict a classification of an object, a material of the object, a behavior of the user of a sensing apparatus, health data, and/or other prediction information as described herein.

At 1218, the method 1200 can include determining an output to perform an adjustment of one or more functionalities of a device according to the calculating result. For example, in various implementations, the adjustments can include changing an operational mode of a device (e.g., low power mode, normal power mode, display on/off, etc.), displaying information (e.g., health status data, etc.), manipulating an AR/VR environment (e.g., object manipulation), performing a task (e.g., implementing a motion plan, unlocking payment authentication, navigation, industrial manufacturing, opening/closing an application, etc.), and/or perform other adjustments, as described herein.

At 1220, the method 1200 can include implementing the adjustment on a device. For example, various control circuits (e.g., controllers, displays, etc.) can be configured to perform the adjustment on the device.

Figure 13:
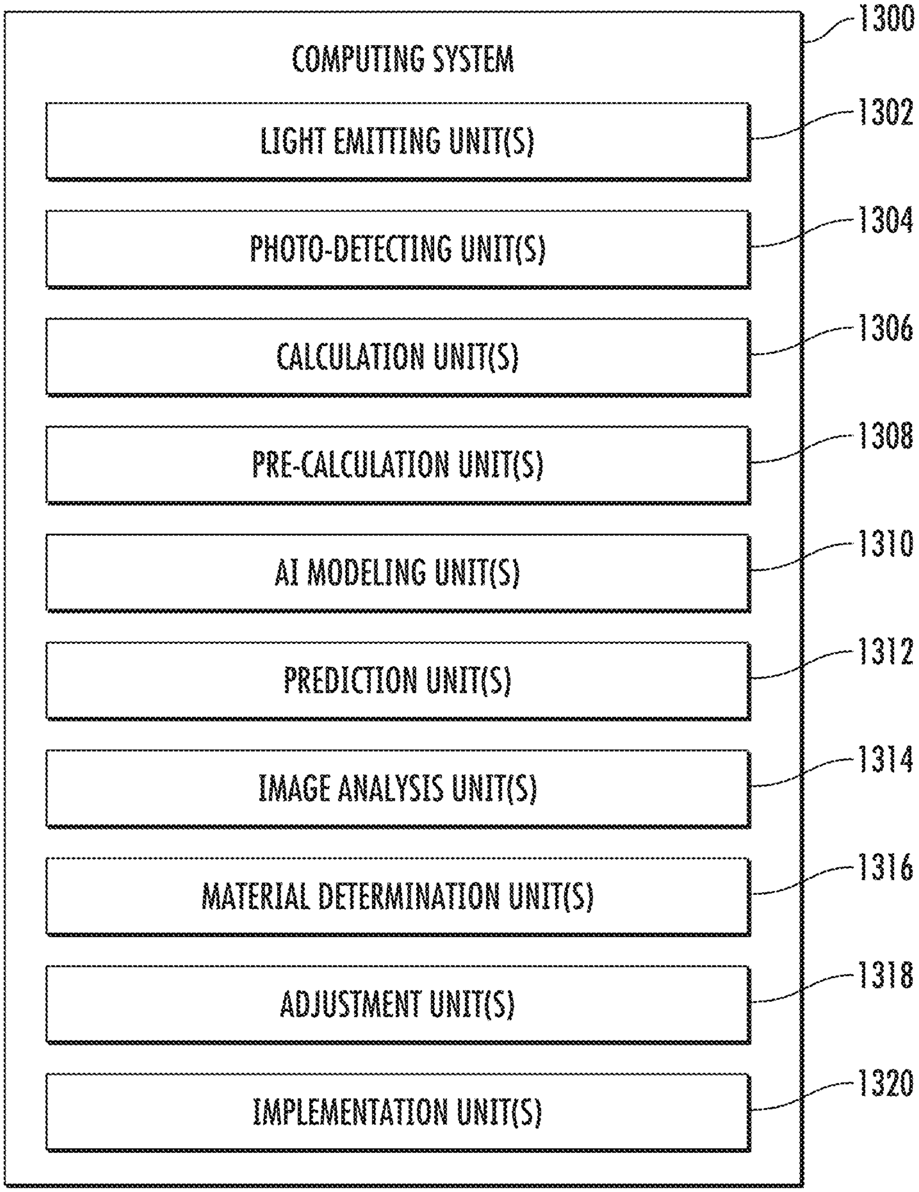
FIG. 13 depicts a diagram of an example system according to example aspects of the present disclosure.

FIG. 13 depicts an example system 1300 with various means for performing operations and functions according to example implementations of the present disclosure. Various means can be configured to perform the methods and processes described herein. For example, a computing system 1300 can include light emitting unit(s) 1302, photo-detecting unit(s) 1304, calculation unit(s) 1306, pre-calculation unit(s) 1308, AI modeling unit(s) 1310, prediction unit(s) 1312, image analysis unit(s) 1314, material determination unit(s) 1316, adjustment unit(s) 1318, implementation unit(s) 1320, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., light emitting unit(s) 1302, etc.) can be configured to emit light, such as light at various wavelengths. In some implementations, light emitting unit(s) 1302 can include lasers (e.g., VCSEL), light emitting diodes (LEDS), and/or other types of light emitting unit(s) 1302. In some implementations, the light emitting unit(s) 1302 can emit (e.g., transmit) a modulated light, a delayed light, and/or other types of light, as described herein.

The means (e.g., photo-detecting unit(s) 1304) can be configured to detect light, such as incident light (e.g., reflected light) at various wavelengths. In some implementations, the photo-detecting unit(s) 1304 can be 2D and/or 3D photo-detecting unit(s) 1304. In some implementations, the photo-detecting unit(s) can be NIR or SWIR photo-detecting unit(s) capable of absorbing light greater than a threshold wavelength (e.g., 1050 nm) in some implementations, the photo-detecting unit(s) can include germanium or a III-V group. In some implementations, the photo-detecting unit(s) 1304 can be configured to detect a reflected light, such as a reflected transmitted light, a reflected sunlight, a reflected ambient light, and/or other types of light, as described herein.

The means (e.g., calculation unit(s) 1306) can be configured to determine a calculating result ED based on a sensor output SO. For example, incident light can be absorbed by a photo-detecting unit(s) 1304, and the sensor output SO can be provided to the calculation unit(s) 1306.

The means (e.g., pre-calculation unit(s) 1308) can be configured to determine a pre-calculation result P01 according to the first detecting signal and the second detecting signal. For example, in some implementations, the pre-calculation unit(s) 1308 can be configured to perform integral or differential calculations on the sensor output signal SO and output a pre-calculation result P01 to one or more machine learned models (e.g., AI modeling units). In some implementations, the integral or differential information can be transformed to a frequency domain (e.g., wavelet transform).

The means (e.g., AI modeling unit(s) 1310) can be configured to perform an image data analysis and output a modeling signal S01, S02, etc. For example, in some implementations, the AI modeling unit(s) 1310 can be configured to perform one or more computer vision analyses, as described herein.

The means (e.g., prediction unit(s) 1312) can be configured to predict certain statuses about an object based on the modeling signals from other means (e.g., pre-calculation unit(s) 1308 and/or AI modeling unit(s) 1310). For example, in various implementations, the prediction unit(s) 1312 can predict an object classification, and object material, a behavior of the user, health data, object trajectories, AR/VR interactions, and/or other properties as described herein.

The means (e.g., image analysis unit(s) 1314) can be configured to analyze image data, such as sensor output data from a 2D or 3D photo-detecting unit 1304. In some implementations, the image analysis unit(s) 1314 can be implemented as a part of a calculation unit 1306, an AI modeling unit 1310, a prediction unit 1312, a material determination unit 1316, and/or other means. In some implementations, the image analysis unit(s) 1314 can be one or more machine-learned models.

The means (e.g., material determination unit(s) 1316) can be configured to determine a type of material of an object. For example, in some implementations, the material determination unit(s) 1316 can be trained to determine a material type of an object based on a magnitude of a reflectivity of incident light at various wavelengths. In some implementations, the material determination unit(s) 1314 can be implemented as a part of a calculation unit 1306, an AI modeling unit 1310, a prediction unit 1312, an image analysis unit 1314, and/or other means. In some implementations, the material determination unit(s) 1316 can be one or more machine-learned models.

The means (e.g., adjustment unit(s) 1318) can be configured to determine an adjustment based on a calculation result. For example, in various implementations, the adjustment can include adjusting one or more functionalities of a sensing apparatus, such as an operational mode, a display mode or informational status, an interaction, a motion, and/or other functionalities as described herein.

The means (e.g., implementation unit(s) 1320) can be configured to implement one or more adjustments determined by the adjustment unit(s) 1318. For example, various controllers can be configured to perform the adjustment.

Figure 14:
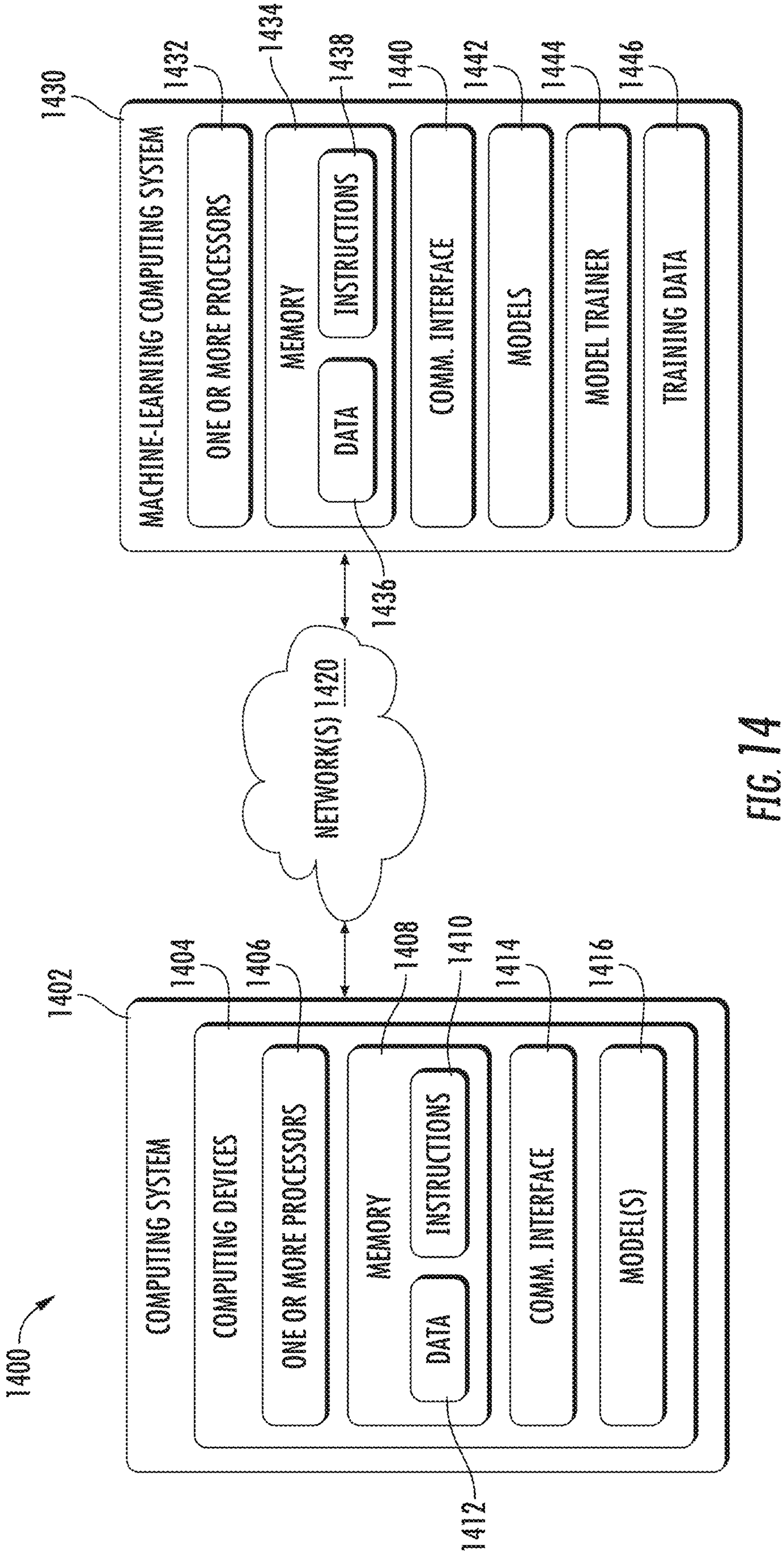
FIG. 14 depicts a diagram of an example system according to example aspects of the present disclosure.

Referring now to FIG. 14, an example computing system 1400 according to example aspects of the present disclosure is depicted. The example system 1400 can include the computing system 1402 and a machine learning computing system 1430 that are communicatively coupled over one or more network(s) 1420. As described herein, the computing system 1402 can be implemented onboard a sensing apparatus, such as personal computing device (e.g., cell phone, tablet, etc.), vehicle computing system, automated/robotic computing system, and/or other computing system.

The computing system 1402 can include one or more computing device(s) 1404. The computing device(s) 1404 of the computing system 1402 can include processor(s) 1406 and a memory 1408. The one or more processors 1406 can be any suitable processing device (e.g., a processor core, a microprocessor, an ASIC, a FPGA, a controller, a microcontroller, etc.) and can be one processor or a plurality of processors that are operatively connected. The memory 1408 can include one or more non-transitory computer-readable storage media, such as RAM, ROM, EEPROM, EPROM, one or more memory devices, flash memory devices, etc., and combinations thereof.

The memory 1408 can store information that can be obtained by the one or more processors 1406. For instance, the memory 1408 (e.g., one or more non-transitory computer-readable storage mediums, memory devices) can include computer-readable instructions 1410 that can be executed by the one or more processors 1406. The instructions 1410 can be software written in any suitable programming language or can be implemented in hardware. Additionally, or alternatively, the instructions 1410 can be executed in logically and/or virtually separate threads on processor(s) 1406.

For example, the memory 1408 can store instructions 1410 that when executed by the one or more processors 1406 cause the one or more processors 1406 (the computing system 1402) to perform operations such as any of the operations and functions of a sensing apparatus, and/or for which the sensing apparatus is configured, the operations for sensing objects and/or determining properties related to objects, (e.g., one or more portions of method 1200), and/or any other operations and functions, as described herein.

The memory 1408 can store data 1412 that can be obtained (e.g., received, accessed, written, manipulated, generated, created, stored, etc.). The data 1412 can include, for instance, wideband sensor output data, control data, reflectivity data, depth data, calibration data, error correction code data, magnitude data, voltage data, readout data, modulation data, timing data, prediction data, machine-learned model data (e.g., AI models, parameters, etc.), object material data, calculating result data, pre-calculation result data, transmitting and incident light wavelength data, modeling signal data, image analysis data, material determination data, apparatus functionality data, adjustment data, implementation data, and/or other data/information described herein. In some implementations, the computing device(s) 1404 can obtain data from one or more memories that are remote from the computing system 1402.

The computing device(s) 1404 can also include a communication interface 1414 used to communicate with one or more other system(s) (e.g., other systems/components onboard and/or remote from the computing system 1402. The communication interface 1414 can include any circuits, components, software, etc. for communicating via one or more networks 1420. In some implementations, the communication interface 1414 can include, for example, one or more of a communications controller, receiver, transceiver, transmitter, port, conductors, software and/or hardware for communicating data/information.

According to an aspect of the present disclosure, the computing system 1402 can store or include one or more machine-learned models 1416 (e.g., AI modeling units). As examples, the machine-learned models 1416 can be or can otherwise include various machine-learned models such as, for example, network models, subnetworks, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, parametric continuous convolutions, etc.), recurrent neural networks (e.g., long short-term memory recurrent neural networks, etc.), and/or other forms of neural networks. The machine-learned models 1416 can include the machine-learned models of FIG. 7 and/or other model(s), as described herein.

In some implementations, the computing system 1402 can receive the one or more machine-learned models 1416 from the machine learning computing system 1430 over the network(s) 1420 and can store the one or more machine-learned models 1416 in the memory 1408 of the computing system 1402. The computing system 1402 can use or otherwise implement the one or more machine-learned models 1416 (e.g., by processor(s) 1406). In particular, the computing system 1402 can implement the machine learned model(s) 1416 to generate pre-calculation data, modeling signal data, object classification data, material identification data, image analysis data, prediction data), etc.

The machine learning computing system 1430 can include one or more processors 1432 and a memory 1434. The one or more processors 1432 can be any suitable processing device (e.g., a processor core, a microprocessor, an ASIC, a FPGA, a controller, a microcontroller, etc.) and can be one processor or a plurality of processors that are operatively connected. The memory 1434 can include one or more non-transitory computer-readable storage media, such as RAM, ROM, EEPROM, EPROM, one or more memory devices, flash memory devices, etc., and combinations thereof.

The memory 1434 can store information that can be accessed by the one or more processors 1432. For instance, the memory 1434 (e.g., one or more non-transitory computer-readable storage mediums, memory devices) can store data 1436 that can be obtained (e.g., generated, retrieved, received, accessed, written, manipulated, created, stored, etc.). In some implementations, the machine learning computing system 1430 can obtain data from one or more memories that are remote from the machine learning computing system 1430.

The memory 1434 can also store computer-readable instructions 1438 that can be executed by the one or more processors 1432. The instructions 1438 can be software written in any suitable programming language or can be implemented in hardware. Additionally, or alternatively, the instructions 1438 can be executed in logically and/or virtually separate threads on processor(s) 1432. The memory 1434 can store the instructions 1438 that when executed by the one or more processors 1432 cause the one or more processors 1432 to perform operations. The machine learning computing system 1430 can include a communication interface 1440, including devices and/or functions similar to that described with respect to the computing system 1402.

In some implementations, the machine learning computing system 1430 can include one or more server computing devices. If the machine learning computing system 1430 includes multiple server computing devices, such server computing devices can operate according to various computing architectures, including, for example, sequential computing architectures, parallel computing architectures, or some combination thereof.

In addition or alternatively to the model(s) 1416 at the computing system 1402, the machine learning computing system 1430 can include one or more machine-learned models 1442 (e.g., AI modeling units). As examples, the machine-learned models 1442 can be or can otherwise include various machine-learned models such as, for example, network models, subnetworks, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, parametric continuous convolutions, etc.), recurrent neural networks (e.g., long short-term memory recurrent neural networks, etc.), and/or other forms of neural networks. The machine-learned models 1442 can be similar to and/or the same as the machine-learned models 1416, and/or other model(s) described herein.

As an example, the machine learning computing system 1430 can communicate with the computing system 1402 according to a client-server relationship. For example, the machine learning computing system 1430 can implement the machine-learned models 1442 to provide a web service to the computing system 1402. Thus, machine-learned models 1442 can be located and used at the computing system 1402 and/or the machine-learned models 1442 can be located and used at the machine learning computing system 1430.

In some implementations, the machine learning computing system 1430 and/or the computing system 1402 can train the machine-learned models 1416 and/or 1442 through use of a model trainer 1444. The model trainer 1444 can train the machine-learned models 1416 and/or 1442 using one or more training or learning algorithms. One example training technique is backwards propagation of errors. In some implementations, the model trainer 1444 can perform supervised training techniques using a set of labeled training data. In other implementations, the model trainer 1444 can perform unsupervised training techniques using a set of unlabeled training data. The model trainer 1444 can perform a number of generalization techniques to improve the generalization capability of the models being trained. Generalization techniques include weight decays, dropouts, or other techniques.

In particular, the model trainer 1444 can train a machine-learned model 1416 and/or 1442 based on a set of training data 1446. The training data 1446 can include previously acquired sensor output (SO) data, such as data from 2D and/or 3D photo-detecting units. In some implementations, the training data 1446 can include labelled or unlabeled object classification training data. In some implementations, the training data 1446 can include labelled or unlabeled material type data. In some implementations, the training data 1446 can include labelled or unlabeled health data (e.g., glucose blood level labels). In some implementations, the training data 1446 can include labelled or unlabeled AR/VR interaction data (e.g., material response data). In some implementations, the training data 1446 can include data which includes a first type of labelled data but does not include other types of labelled data. For example, the training data 1446 can include object classification labels in which objects are labelled but material property types of the objects may not be labelled. Even without material type labels, the training data 1446 can be used by the model trainer 1444 to train the models 1442/1416 to incorporate data indicative of material types (e.g., wavelength reflectivity data) into object classification determinations, as described herein. Other model functionalities described herein can similarly be trained using appropriate training data 1446. The model trainer 1444 can be implemented in hardware, firmware, and/or software controlling one or more processors.

The network(s) 108 can be any type of network or combination of networks that allows for communication between devices. In some embodiments, the network(s) 108 can include one or more of a local area network, wide area network, the Internet, secure network, cellular network, mesh network, peer-to-peer communication link and/or some combination thereof and can include any number of wired or wireless links. Communication over the network(s) 108 can be accomplished, for instance, via a network interface using any type of protocol, protection scheme, encoding, format, packaging, etc.

FIG. 14 illustrates one example system 1400 that can be used to implement the present disclosure. Other computing systems can be used as well. For example, in some implementations, the computing system 1402 can include the model trainer 1444 and the training dataset 1446. In such implementations, the machine-learned models 1416/1442 can be both trained and used locally at the computing system 1402.

Computing tasks discussed herein as being performed at computing system 1420 remote from machine-learned computing system 1430 can instead be performed at the machine-learned computing system 1430, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

This application provides the sensing apparatus using wideband sensor to enable novel environment/context awareness (e.g., bio-identification, 3D reconstruction, gesture/skeleton detection, target characterization, material analysis, blood glucose or user scenario definition) and implement further responses (e.g., unlock/payment authentication, navigation, UI/posture monitoring and RF signal/power optimization). which creates more new wideband applications in the market and resolve multipath interference as well.

In addition to using silicon as a light absorption material in the photodetector, this application also provides a photodetector using a material (e.g., germanium or III-V group) capable of absorbing a light with longer wavelength (e.g., the wavelength is greater than 1050 nm).

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing apparatus, comprising:

a light emitting unit comprising a first light source configured to transmit a first transmitting light, a second light source configured to transmit a second transmitting light;

a first chip comprising a plurality of photodetectors formed on a first side of a silicon substrate and configured to receive, from a second side of the silicon substrate, a first incident light having a first wavelength and a second incident light having a second wavelength, wherein the second side is opposite to the first side;

an interconnection layer comprising a plurality of vias and connecting to the first chip;

a second chip wafer-bonded to the first chip through the interconnection layer and electrically connecting to the first chip through the plurality of vias, wherein the second chip is configured to generate a first detecting signal in response to the first incident light and a second detecting signal in response to the second incident light;

a calculation circuit configured to output a calculating result in response to a comparison of the first detecting signal and the second detecting signal; and an adjustment circuit, coupled to the calculation circuit, configured to dynamically adjust a power mode associated with the sensing apparatus according to the calculating result, wherein the calculating result represents a material type of an object, a behavior of a user using the sensing apparatus, or a health data.

2. The sensing apparatus of claim 1, further comprising a micro-lens array positioned on the second side of the silicon substrate.

3. The sensing apparatus of claim 2, wherein the micro-lens array includes silicon.

4. The sensing apparatus of claim 2, further comprising a filter array positioned between the silicon substrate and the micro-lens array.

5. The sensing apparatus of claim 4, further comprising a spacer formed on the filter array.

6. The sensing apparatus of claim 4, wherein the first chip comprises a through via for connecting the light emitting unit.

7. The sensing apparatus of claim 1, wherein the first wavelength is within a NIR spectrum or a SWIR spectrum, and wherein the second wavelength is within the SWIR spectrum.

8. The sensing apparatus of claim 1, wherein the calculation circuit can be configured to calculate a magnitude difference between the first detecting signal and the second detecting signal.

9. The sensing apparatus of claim 1, wherein the calculation circuit can be configured to calculate a magnitude ratio between the first detecting signal and the second detecting signal.

10. The sensing apparatus of claim 1, wherein the power mode comprises a low power mode and a normal power mode.

11. The sensing apparatus of claim 10, wherein the sensing apparatus is configured to stop playing music or disable a software application in response to the adjustment circuit adjusting the power mode into the low power mode.

12. The sensing apparatus of claim 1, wherein the material type includes skin.

13. The sensing apparatus of claim 1, wherein the calculating result indicates a health data of a user being sensed by the sensing apparatus.

14. The sensing apparatus of claim 1, wherein the calculating result indicates a moisture content of an object being sensed by the sensing apparatus.

15. The sensing apparatus of claim 1, wherein the plurality of photodetectors comprise a first photodetector and a second photodetector, wherein the first photodetector has a first light absorption material and the second photodetector has a second light absorption material, and wherein the first light absorption material and the second light absorption material are different.

16. The sensing apparatus of claim 15, wherein the first light absorption material comprises silicon, and the second light absorption material comprises germanium or III-V group material.

17. The sensing apparatus of claim 1, wherein the plurality of photodetectors comprises a first photodetector and a second photodetector having a same absorption material as the first photodetector, wherein the absorption material comprises germanium or III-V group material.

18. The sensing apparatus of claim 1, wherein the second chip comprises a controller configured to generate a signal to control the first light source and the second light source.

19. The sensing apparatus of claim 1, wherein the light emitting unit comprises a bonding pad, wherein the bonding pad is connected to the first chip via at least one bonding wire.

20. The sensing apparatus of claim 1, wherein the sensing apparatus includes an earphone or a wearable watch.

* * * * *